US012729771B2

(12) United States Patent
Heidemann et al.

(10) Patent No.: US 12,729,771 B2
(45) Date of Patent: Sep. 8, 2026

(54) SYSTEMS AND METHODS FOR A THERMAL MANAGEMENT CONTROL VALVE WITH A LOUVER PLATE ASSEMBLY

(71) Applicant: HUSCO Automotive Holdings LLC, Waukesha, WI (US)

(72) Inventors: Brian Heidemann, Lake Mills, WI (US); Austin Schmitt, Menomonee Falls, WI (US); Benjamin Teich, Milwaukee, WI (US); Benjamin Everson, Menomonee Falls, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 0 days.

(21) Appl. No.: 19/060,375

(22) Filed: Feb. 21, 2025

(65) Prior Publication Data

US 2025/0271067 A1 Aug. 28, 2025

Related U.S. Application Data

(60) Provisional application No. 63/557,258, filed on Feb. 23, 2024.

(51) Int. Cl.
*F16K 11/065* (2006.01)
*F16K 25/00* (2006.01)
(Continued)

(52) U.S. Cl.
CPC .......... *F16K 11/0655* (2013.01); *F16K 25/00* (2013.01); *B60H 1/00278* (2013.01);
(Continued)

(58) Field of Classification Search
CPC .... F16K 11/0655; F16K 25/00; F16K 31/047; F16K 31/52483; F16K 31/5286;
(Continued)

(56) References Cited

U.S. PATENT DOCUMENTS 1,567,537 A 12/1925 Mockus
2,601,231 A 6/1952 Smith et al.
(Continued)

FOREIGN PATENT DOCUMENTS

CN 113404880 B 10/2021
WO WO-2023/023277 A1 2/2023

OTHER PUBLICATIONS

International Search Report and Written Opinion for International Application No. PCT/US2024/011360, mailed May 10, 2024, 8 pages.

*Primary Examiner* — Minh Q Le
(74) *Attorney, Agent, or Firm* — FOLEY & LARDNER LLP

(57) ABSTRACT

A thermal management control valve includes a housing assembly having a first housing section and a second housing section, a rotary actuator coupled to a drive shaft, and a louver plate assembly. The louver plate assembly includes a louver plate, a first seal plate, and a second seal plate. The louver plate is coupled to the drive shaft so that rotation of the drive shaft is configured to selectively move the louver plate along a louver direction between a first position and a second position. The first seal plate includes one or more first seal plate slots that are elongated in a direction that is generally parallel to the louver direction, and the second seal plate includes one or more first seal plate slots that are elongated in a direction that is generally perpendicular to the louver direction.

20 Claims, 23 Drawing Sheets

(51) Int. Cl.

| | |
|---|---|
| *B60H 1/00* | (2006.01) |
| *B60K 1/00* | (2006.01) |
| *B60K 11/02* | (2006.01) |
| *F01P 7/14* | (2006.01) |
| *F16K 3/02* | (2006.01) |
| *F16K 27/04* | (2006.01) |
| *F16K 31/04* | (2006.01) |
| *F16K 31/524* | (2006.01) |
| *F16K 31/528* | (2006.01) |
| *F16K 31/53* | (2006.01) |

(52) U.S. Cl.

CPC ......... *B60K 2001/003* (2013.01); *B60K 11/02* (2013.01); *F01P 2007/146* (2013.01); *F01P 2050/24* (2013.01); *F16K 3/0227* (2013.01); *F16K 3/0254* (2013.01); *F16K 27/044* (2013.01); *F16K 31/047* (2013.01); *F16K 31/52483* (2013.01); *F16K 31/5286* (2013.01); *F16K 31/53* (2013.01)

(58) Field of Classification Search

CPC ...... F16K 31/53; F16K 3/0227; F16K 3/0254; F16K 27/044; B60K 2001/003; B60K 11/02; F01P 2007/146; F01P 2050/24; B60H 1/00278

USPC ..................................................... 137/625.48

See application file for complete search history.

(56) References Cited

U.S. PATENT DOCUMENTS

| | | | | |
|---|---|---|---|---|
| 2,828,767 | A * | 4/1958 | Barusch | F16K 11/0655 137/625.48 |
| 2,858,851 | A * | 11/1958 | Holl | F16K 27/04 251/117 |
| 2,993,488 | A | 7/1961 | Stec | |
| 3,269,694 | A | 8/1966 | Hardison | |
| 3,312,241 | A * | 4/1967 | Bryant | F16K 31/1221 137/599.08 |
| 3,318,568 | A | 5/1967 | Blomstran | |
| 3,358,961 | A * | 12/1967 | Montgomery | F16K 13/06 137/68.13 |
| 4,275,866 | A * | 6/1981 | Jamar | F16K 3/0254 251/329 |
| 4,372,531 | A * | 2/1983 | Rollins | F16K 3/0263 251/328 |
| 4,561,471 | A * | 12/1985 | Diaz | F16K 11/0655 137/625.48 |
| 4,579,143 | A * | 4/1986 | Rollins | F23K 5/18 137/238 |
| 4,643,226 | A | 2/1987 | Balz | |
| 4,647,005 | A * | 3/1987 | Hunter | F16K 3/0254 251/327 |
| 4,972,878 | A | 11/1990 | Carlin | |
| 5,230,367 | A | 7/1993 | Minch | |
| 5,649,512 | A * | 7/1997 | Flanery, Jr. | F02D 31/005 123/339.23 |
| 5,706,852 | A * | 1/1998 | Deville | F16K 27/044 137/552 |
| 6,378,556 | B1 * | 4/2002 | Fondse | F16K 31/06 137/625.48 |
| 6,443,426 | B1 * | 9/2002 | Brenes | F16K 51/02 403/321 |
| 7,152,271 | B2 * | 12/2006 | Pfautz | H05K 3/26 15/301 |
| 7,255,324 | B2 | 8/2007 | Schlude | |
| 12,305,774 | B2 * | 5/2025 | Schmitt | F16K 31/5286 |
| 2006/0230957 | A1 * | 10/2006 | Shimizu | F16K 3/029 101/232 |
| 2009/0101856 | A1 * | 4/2009 | Frias | F16K 31/54 251/129.03 |
| 2017/0356553 | A1 * | 12/2017 | Cassel | F16K 37/0008 |
| 2020/0256476 | A1 * | 8/2020 | Sevilla | F16K 27/044 |
| 2021/0062687 | A1 | 3/2021 | Siefker et al. | |
| 2021/0348689 | A1 | 11/2021 | Mann | |
| 2023/0235833 | A1 * | 7/2023 | Rutar | F16K 1/36 251/167 |
| 2024/0317017 | A1 * | 9/2024 | Brock | B60H 1/00571 |
| 2025/0020237 | A1 * | 1/2025 | Brockner | F16K 31/52475 |
| 2026/0002607 | A1 * | 1/2026 | Mason | F16K 11/0655 |

* cited by examiner

SYSTEMS AND METHODS FOR A THERMAL MANAGEMENT CONTROL VALVE WITH A LOUVER PLATE ASSEMBLY

CROSS-REFERENCE TO RELATED PATENT APPLICATIONS

This application claims the benefit of and priority to U.S. Provisional Application No. 63/557,258, filed on Feb. 23, 2024, the entire disclosure of which is hereby incorporated by reference herein.

BACKGROUND

Thermal control valves are used, for example, in hybrid and battery-powered vehicle applications to control a flow of working fluid that acts to heat or cool a device or component.

SUMMARY

In some aspects, the present disclosure relates to a thermal management control valve including: a housing assembly including a first housing section and a second housing section; a rotary actuator coupled to a drive shaft that extends into the housing assembly; and a louver plate assembly enclosed within the housing assembly and including: a louver plate including a plurality of louver slots, each extending through the louver plate, wherein the louver plate is coupled to the drive shaft so that rotation of the drive shaft is configured to selectively move the louver plate along a louver direction between a first position and a second position; a first seal plate arranged between the louver plate and the first housing section, wherein the first seal plate includes one or more first seal plate slots that are elongated in a direction that is generally parallel to the louver direction; and a second seal plate arranged between the louver plate and the second housing section, wherein the second seal plate includes one or more second seal plate slots that are elongated in a direction that is generally perpendicular to the louver direction.

In some aspects, the present disclosure relates to a thermal management control valve including: a housing assembly including a first housing section and a second housing section; a rotary actuator coupled to a drive shaft that extends into the housing assembly; and a louver plate assembly enclosed within the housing assembly and including: a louver plate including a plurality of louver slots, each extending through the louver plate, wherein the louver plate is coupled to the drive shaft so that rotation of the drive shaft is configured to selectively move the louver plate along a louver direction between a first position and a second position; a first seal plate arranged between the louver plate and the first housing section, and including one or more first seal plate slots; and a second seal plate arranged between the louver plate and the second housing section, and including one or more second seal plate slots, wherein the first seal plate and the second seal plate are arranged along a central axis, wherein the first seal plate defines a different rotational orientation about the central axis than the second seal plate, and wherein the different rotational orientation defines a first louver passageway, a second louver passageway, a third louver passageway, and a fourth louver passageway within the louver plate assembly that are selectively opened and closed by movement of the louver plate between the first position and the second position.

In some aspects, the present disclosure relates to a thermal management control valve including: a housing assembly including a first housing section and a second housing section, wherein the second housing section at least partially defines a louver manifold, and wherein the louver manifold includes a pair of opposing sidewalls; a first pair of mounting tabs that protrude outwardly from one of the pair of opposing sidewalls; a second pair of mounting tabs that protrude outwardly from another of the pair of opposing sidewalls; and a louver plate assembly at least partially received within the louver manifold and including: a louver plate; a first seal plate arranged between the louver plate and the first housing section; and a first static seal plate arranged between the first seal plate and the louver plate, and including mounting notches arranged on opposing outer surfaces thereof, wherein the first pair of mounting tabs extend into the mounting notch formed on one of the opposing outer surfaces and the second pair of mounting tabs extend into the mounting notch on another of the opposing outer surfaces, so that the first pair of mounting tabs and the second pair of mounting tabs constrain a location of the first static seal plate within the louver manifold.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
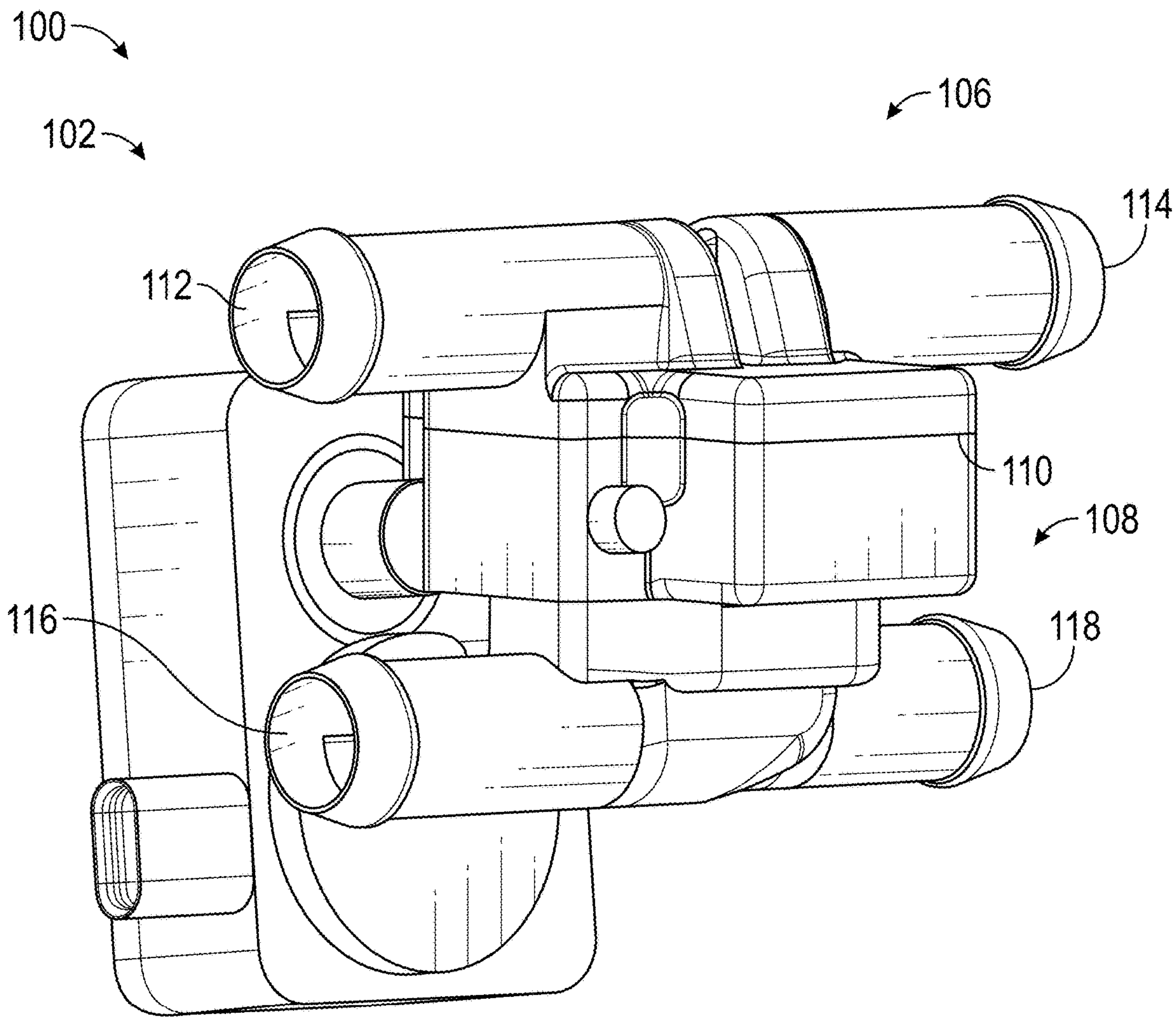
FIG. 1 is a perspective view of a thermal management control valve, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The use herein of the term "axial" and variations thereof refers to a direction that extends generally along an axis of symmetry, a central axis, or an elongate direction of a particular component or system. For example, axially extending features of a component may be features that extend generally along a direction that is parallel to an axis of symmetry or an elongate direction of that component. Similarly, the use herein of the term "radial" and variations thereof refers to directions that are generally perpendicular to a corresponding axial direction. For example, a radially extending structure of a component may generally extend at least partly along a direction that is perpendicular to a longitudinal or central axis of that component. The use herein of the term "circumferential" and variations thereof refers to a direction that extends generally around a circumference of an object or around an axis of symmetry, a central axis or an elongate direction of a particular component or system.

Hybrid electric and battery electric vehicles include a high-voltage battery or an array of high-voltage battery packs that supply electric power to various components on the vehicle (e.g., drive motors, user interfaces, power take off (PTO) units, electric power steering motors, etc.). The automotive vehicle market (e.g., on-road or on-highway vehicles) is trending toward the development of longer all-electric ranges to allow a user to drive longer distances between battery charges. The demand for longer all-electric range requires batteries/battery packs with higher capacities that define a larger mounting footprint/volume, when compared to lower all-electric range vehicles. Also, increasing the battery/battery pack capacity typically increases the thermal management demand (e.g., heating and cooling capacities) required to provide temperature control of the battery/battery pack and the various other components on the vehicle that are actively or passively heated and/or cooled (e.g., power electronics, drive motors, HVAC systems etc.). So there is less space available to mount thermal management components (e.g., control valves, pumps, heat exchangers, conduits/tubing) and a need for the thermal management components to meet higher requirements for heating and cooling capacities, which is conventionally accommodated by using larger thermal management components.

The systems and methods of the present disclosure relate to a thermal management control valve that includes a flow control assembly (e.g., a louver plate assembly) that is selectively moved to open/close various flow paths that within a housing of the thermal management control valve. The thermal management control valve includes a louver plate assembly having a louver plate, a first seal plate, and a second seal plate. In general, the first seal plate and the second seal plate define different rotational orientations (e.g., about a central axis), which enables the louver plate assembly to define various fluid passageways through the louver plate, depending on the position of the louver plate. For example, the louver plate may be movable between the first position and a second position, and the louver plate assembly may provide fluid communication along at least two of the fluid passageway defined by the louver plate assembly in each of the first position and the second position. In this way, for example, the louver plate assembly is able service several flow paths and components (e.g., pumps, valves, heat exchangers) that receive fluid flow from the flow paths, while maintaining a small packaging size (e.g., when compared to conventional thermal management control valves)

Figure 2:
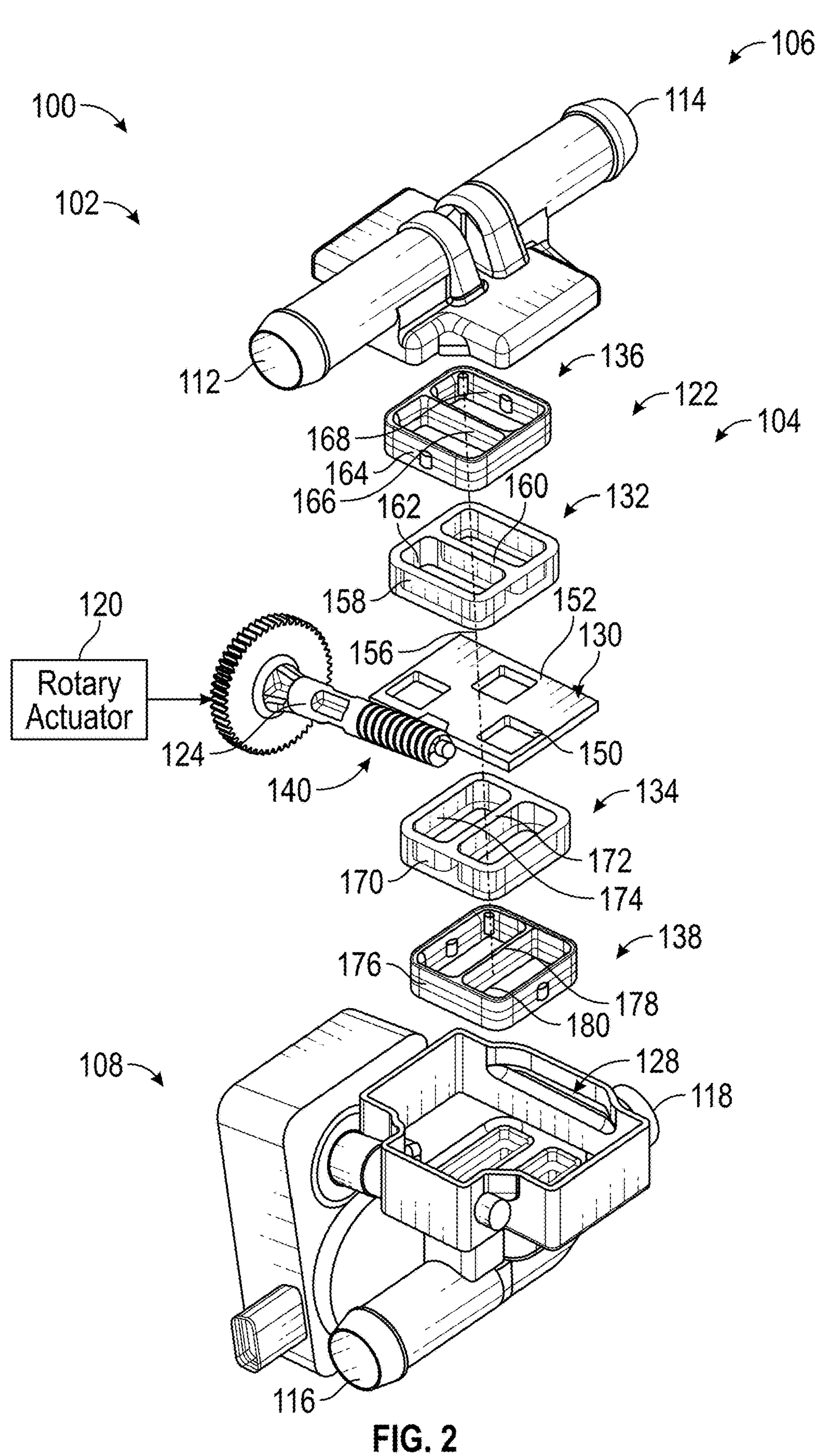
FIG. 2 is an exploded view of the thermal management control valve of FIG. 1.
Figure 3:
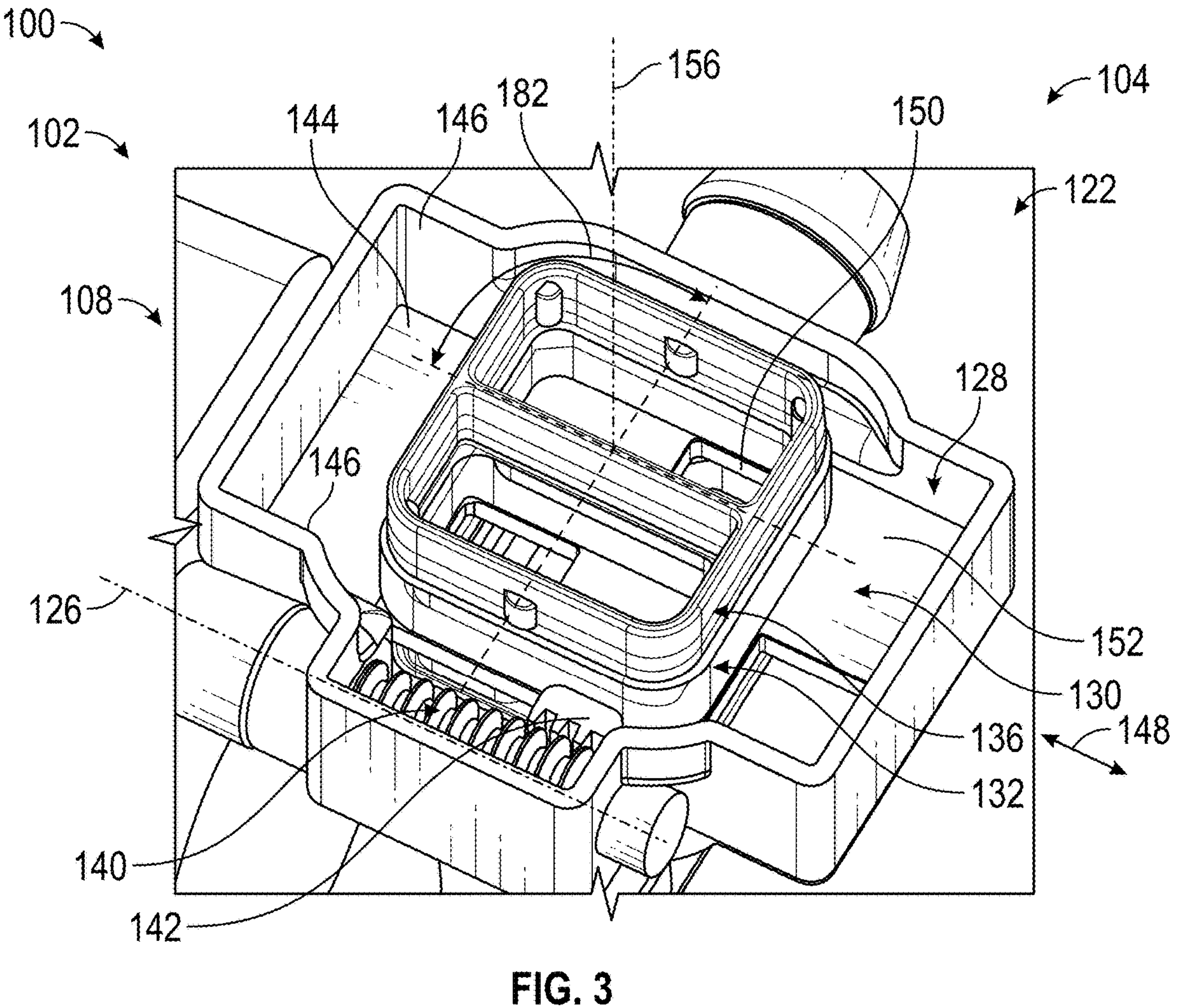
FIG. 3 is a perspective view of the thermal management control valve of FIG. 1 with a first housing removed.

FIGS. 1-3 show a thermal management control valve 100, according to an exemplary embodiment of the present disclosure. In general, the thermal management control valve 100 is configured to control fluid flow (e.g., direction, routing, flowrate, and/or on/off control) for one or more working fluids in heating and/or cooling systems on an electric vehicle. The use of the term "electric vehicle" and variations thereof refers to a battery electric vehicle, a fully electric vehicle, a plug-in-hybrid vehicle, or a hybrid vehicle that is intended to be driven on a road or highway. In some embodiments, the thermal management control valve 100 provides flow control for a single type of working fluid (e.g., air, water, refrigerant, oil, etc.).

The thermal management control valve 100 includes a housing, shown as housing assembly 102, and a flow control assembly 104 enclosed within the housing assembly 102. The housing assembly 102 includes a first or upper housing section 106 and a second or lower housing section 108. In some embodiments, the first housing section 106 and the second housing section 108 are fabricated from a polymer or plastic material. In some embodiments, the first housing section 106 and the second housing section 108 are manufactured via a plastic injection molding.

In general, the coupling formed between the first housing section 106 and the second housing section 108 is formed along a coplanar interface. For example, a bonding interface 110 formed between the first housing section 106 and the second housing section 108 is formed between coplanar surfaces of the first housing section 106 and the second housing section 108. Forming the bonding interface 110 between coplanar surfaces forms coplanar bonding interfaces that enable a simplified and efficient bonding processes to be utilized to form the bonds between the first housing section 106 and the second housing section 108. Additionally, forming the bonds between the first housing section 106 and the second housing section 108 along a coplanar bonding interface improves the manufacturing efficiency of the housing assembly 102.

Each of the first housing section 106 and the second housing section 108 include one or more ports that facilitate a connection between the housing assembly 102 and a thermal management component (e.g., a heat exchanger, a pump, a check valve, a conduit/tube, etc.) or another port on an electric vehicle. In general, the housing assembly 102 may be designed to include any port configuration (e.g., number and arrangement of the ports) dictated by a particular electric vehicle application. In some embodiments, the port configuration may be quickly and efficiently changed by modifying a mold design used to plastic injection mold the housing assembly 102.

In the illustrated embodiment, the first housing section 106 includes a first housing port 112 and a second housing port 114, and the second housing section 108 includes a third housing port 116 and a fourth housing port 118. As will be described herein, each of the first housing port 112 and the second housing port 114 is in fluid communication with a fluid chamber arranged within the first housing section 106, and each of the third housing port 116 and the fourth housing port 118 is in fluid communication with a fluid chamber arranged within the second housing section 108. In some embodiments, the first housing section 106 and the second housing section 108 may each include more or less than two ports.

In general, the flow control assembly 104 is configured to selectively control fluid flow between the ports of the housing assembly 102 (e.g., the first housing port 112, the second housing port 114, the third housing port 116, and the fourth housing port 118). For example, the flow control assembly 104 includes a rotary actuator 120 (e.g., a rotary motor, a stepper motor, an electric motor, etc.) and a louver plate assembly 122. The rotary actuator 120 is coupled to a drive shaft 124 and the rotary actuator 120 is configured to rotate in a predetermined direction and a predetermined magnitude (e.g., a predetermined rotational distance) in response to energization of the rotary actuator 120. The drive shaft 124 defines a drive axis 126 and extends into a louver cavity or chamber, shown as louver manifold 128 formed within the housing assembly 102. For example, a portion of the louver manifold 128 may be formed by the first housing section 106 and a portion of the louver manifold 128 may be formed by the second housing section 108. When the first housing section 106 is installed on the second housing section 108, the respective portions of the louver manifold 128 formed by the first housing section 106 and the second housing section 108 define an enclosure that forms the louver manifold 128 and houses the components of the louver plate assembly 122.

The drive shaft 124 extends into the housing assembly 102 (e.g., into the second housing section 108) at a location that is offset (e.g., does not intersect with) from the bonding interface 110 formed between the first housing section 106 and the second housing section 108. In other words, an entirety of the drive shaft 124 is offset from the bonding interface 110. This offset arrangement of the drive shaft 124 enables the bonding interface 110 to maintain its coplanar orientation and the associated manufacturing advantages associated therewith. For example, the bonding interface 110 is not required to form a seal around a split interface that curves around opposing sides of the drive shaft 124.

Turning to FIGS. 2-7, the flow control assembly 104 and the louver plate assembly 122 are shown in more detail. In the illustrated embodiment, the louver plate assembly 122 is coupled to the drive shaft 124, so that selective rotation of the drive shaft 124 results in linear movement or translation within the louver plate assembly 122 (e.g., linear movement or translation of a louver plate). The selective rotation of the drive shaft 124 and corresponding linear movement within the louver plate assembly 122 results in selective opening and/or closing of flow paths between the first housing port 112, the second housing port 114, the third housing port 116, and the fourth housing port 118.

The louver plate assembly 122 includes a louver plate 130, a first seal plate 132, a second seal plate 134, a first static seal 136, and a second static seal 138. The louver plate 130 is coupled to the drive shaft 124 and housed within the louver manifold 128. Specifically, the drive shaft 124 includes a threaded portion 140 having threads (e.g., helical external threads) that extend axially along the threaded portion 140 and that couple with a threaded protrusion 142 of the louver plate 130. The threaded protrusion 142 includes threads (e.g., helical internal threads) that are threaded with the threads on the threaded portion 140 of the drive shaft 124. The louver plate 130 is supported on an inner surface 144 of the louver manifold 128 within the second housing section 108 and guided or constrained by sidewalls 146 of the louver manifold 128 within the second housing section 108 (see, e.g., FIG. 3). During operation, selective rotation of the drive shaft 124 by the rotary actuator 120 results in rotation of the threaded portion 140, and the rotation of the threaded portion 140 applies a force on the louver plate 130, due to the threaded coupling between the threaded portion 140 and the threaded protrusion 142, that acts to move the louver plate 130 along a louver direction 148. The sidewalls 146 act as guides to constrain or limit the louver plate 130 to travel along the louver direction 148 during movement of the louver plate 130. The selective movement of the louver plate 130 along the louver direction 148 provides various connections between the first housing port 112, the second housing port 114, the third housing port 116, and the fourth housing port 118, as will be described herein. It should be appreciated that the worm drive-like actuation or movement of the louver plate 130 driven by the threaded interaction between the drive shaft 124 and the louver plate 130 is but one exemplary embodiment for actuating or moving the louver plate 130 along the louver direction 148. In some embodiments, the rotary actuator 120 may rotate a spur gear, a cam, or an equivalent mechanism that converts rotational motion to linear motion to selectively move the louver plate 130 along the louver direction 148.

The louver plate 130 includes a plurality of louver apertures, holes, cutouts, shown as a plurality of louver slots 150. Each of the plurality of louver slots 150 extends through the louver plate 130. Specifically, each of the plurality of louver slots 150 extends through both an upper or first louver surface 152 and a lower or second louver surface 154 of the louver plate 130. In the illustrated embodiment, the louver plate 130 includes three of the louver slots 150, with each of the louver slots 150 being spaced along the louver direction 148 and at least one of the louver slots 150 being spaced along a direction generally perpendicular to the louver direction 148. In some embodiments, the louver plate 130 may include more or less than three of the louver slots 150, with the louver slots 150 spaced along the louver plate 130 in various orientations.

When the louver plate assembly 122 is assembled, the first seal plate 132, the second seal plate 134, the first static seal 136, and the second static seal 138 are arranged along a central axis 156. The first seal plate 132 is arranged between the louver plate 130 and the first static seal 136 (e.g., in a direction along the central axis 156), and between the louver plate 130 and the first housing section 106. The second seal plate 134 is arranged between the louver plate 130 and the second static seal 138 (e.g., along the central axis 156), and between the louver plate 130 and the second housing section 108. In the exemplary embodiment, the first seal plate 132 is in engagement with the first louver surface 152 so that a seal is formed therebetween, and the second seal plate 134 is in engagement with the second louver surface 154 so that a seal is formed therebetween. In some embodiments, the first seal plate 132 and the second seal plate 134 form a mechanical face seal against opposing sides of the louver plate 130.

The first static seal 136 forms a seal between the first seal plate 132 and the housing assembly 102 (e.g., the first housing section 106). Specifically, the first static seal 136 forms a seal between the first seal plate 132 and internal channels within the first housing section 106 that are in fluid communication with a respective one of the first housing port 112 or the second housing port 114. In some embodiments, the first static seal 136 is fabricated from an elastomer material. In some embodiments, the first static seal 136 is compressed between the first housing section 106 and the first seal plate 132 so that the first static seal 136 provides a biasing force on the first seal plate 132 that biases the first seal plate 132 in a direction toward the louver plate 130, and aids in maintaining a fluid seal between the louver plate 130, the first seal plate 132, the first static seal 136, and the first housing section 106.

The second static seal 138 forms a seal between the second seal plate 134 and the housing assembly 102 (e.g., the second housing section 108). Specifically, the second static seal 138 forms a seal between the second seal plate 134 and internal channels within the second housing section 108 that are in fluid communication with a respective one of the third housing port 116 or the fourth housing port 118. In some embodiments, the second static seal 138 is fabricated from an elastomer material. In some embodiments, the second static seal 138 is compressed between the second housing section 108 and the second seal plate 134 so that the second static seal 138 provides a biasing force on the second seal plate 134 that biases the second seal plate 134 in a direction toward the louver plate 130, and aids in maintaining a fluid seal between the louver plate 130, the second seal plate 134, the second static seal 138, and the second housing section 108.

In general, each of the first seal plate 132, the second seal plate 134, the first static seal 136, and the second static seal 138 include cutouts, channels, slots, or apertures that define fluid connections to each of the first housing port 112, the second housing port 114, the third housing port 116, and the fourth housing port 118. In the illustrated embodiment, the first seal plate 132 includes a first outer plate wall 158 extending around a periphery of the first seal plate 132 and a first inner plate wall 160 that extends across an interior of the first seal plate 132 and connects to opposing sides of the first outer plate wall 158. The first seal plate 132 includes one or more seal plate channels, cutouts, or apertures, shown as first seal plate slots 162 that extend through the first seal plate 132. In the illustrated embodiment, the first seal plate 132 includes two of the first seal plate slots 162. Each of the first seal plate slots 162 is bordered or enclosed by the first outer plate wall 158 and the first inner plate wall 160, with one of the first seal plate slots 162 being arranged on one side of the first inner plate wall 160 and another of the first seal plate slots 162 being arranged on an opposing side of the first inner plate wall 160.

The first static seal 136 includes a similar shape and profile as the first seal plate 132. Specifically, the first static seal 136 includes a first outer seal wall 164 extending around a periphery of the first static seal 136 and a first inner seal wall 166 that extends across an interior of the first static seal 136 and connects to opposing sides of the first outer seal wall 164. The first static seal 136 includes a pair of seal plate channels, cutouts, or apertures, shown as first static seal slots 168 that extend through the first static seal 136. Each of the first static seal slots 168 is bordered or enclosed by the first outer seal wall 164 and the first inner seal wall 166, with one of the first static seal slots 168 being arranged on one side of the first inner seal wall 166 and another of the first static seal slots 168 being arranged on an opposing side of the first inner seal wall 166.

When the louver plate assembly 122 is assembled, the first seal plate 132 is rotationally aligned with the first static seal 136 about the central axis 156, so that each of the first seal plate slots 162 aligns with a corresponding one of the first static seal slots 168 and the first inner plate wall 160 is rotationally aligned with (e.g., generally parallel to) the first inner seal wall 166. The seals formed between the louver plate 130, the first seal plate 132, and the first static seal 136 provide a sealed connection to each of the first housing port 112 and the second housing port 114. Specifically, one of the aligned set of the first seal plate slots 162 and the first static seal slots 168 forms a sealed fluid connection between the first housing port 112 and the louver plate 130, and another of the aligned set of the first seal plate slots 162 and the first static seal slots 168 forms a sealed fluid connection between the second housing port 114 and the louver plate 130.

In the illustrated embodiment, the second seal plate 134 includes a second outer plate wall 170 extending around a periphery of the second seal plate 134 and a second inner plate wall 172 that extends across an interior of the second seal plate 134 and connects to opposing sides of the second outer plate wall 170. The second seal plate 134 includes a pair of seal plate channels, cutouts, or apertures, shown as second seal plate slots 174 that extend through the second seal plate 134. Each of the second seal plate slots 174 is bordered or enclosed by the second outer plate wall 170 and the second inner plate wall 172, with one of the second seal plate slots 174 being arranged on one side of the second inner plate wall 172 and another of the second seal plate slots 174 being arranged on an opposing side of the first inner plate wall 160.

The second static seal 138 includes a similar shape and profile as the second seal plate 134. Specifically, the second static seal 138 includes a second outer seal wall 176 extending around a periphery of the second static seal 138 and a second inner seal wall 178 that extends across an interior of the second static seal 138 and connects to opposing sides of the second outer seal wall 176. The second static seal 138 includes a pair of seal plate channels, cutouts, or apertures, shown as second static seal slots 180 that extend through the second static seal 138. Each of the second static seal slots 180 is bordered or enclosed by the second outer seal wall 176 and the second inner seal wall 178, with one of the second static seal slots 180 being arranged on one side of the second inner seal wall 178 and another of the second static seal slots 180 being arranged on an opposing side of the second inner seal wall 178.

When the louver plate assembly 122 is assembled, the second seal plate 134 is rotationally aligned with the second static seal 138 about the central axis 156, so that each of the second seal plate slots 174 aligns with a corresponding one of the second static seal slots 180 and the second inner plate wall 172 is rotationally aligned with (e.g., generally parallel to) the second inner seal wall 178. The seals formed between the louver plate 130, the second seal plate 134, and the second static seal 138 provide a sealed connection to each of the third housing port 116 and the fourth housing port 118. Specifically, one of the aligned set of the second seal plate slots 174 and the second static seal slots 180 forms a sealed fluid connection between the third housing port 116 and the louver plate 130, and another of the aligned set of the second seal plate slots 174 and the second static seal slots 180 forms a sealed fluid connection between the fourth housing port 118 and the louver plate 130.

As described herein, the louver plate assembly 122 forms an individually sealed fluid connection to each of the first housing port 112, the second housing port 114, the third housing port 116, and the fourth housing port 118. In general, the first seal plate 132 defines a different rotational orientation about the central axis 156 than the second seal plate 134 so that the louver plate assembly 122 forms a plurality of louver ports or passageways that are selectively opened and closed, via movement of the louver plate 130 along the louver direction 148, to provide and inhibit fluid flow along various flow paths formed between the first housing port 112, the second housing port 114, the third housing port 116, and the fourth housing port 118. For example, the rotational orientation of the first seal plate 132 may be different than the second seal plate 134 so that an intersection angle 182 formed between a centerline of the first inner plate wall 160 and a centerline of the second inner plate wall 172 is greater than zero degrees and less or equal to than ninety degrees, or greater than about ten degrees and less than or equal to ninety degrees, or greater than about twenty degrees and less than or equal to ninety degrees, or greater than about thirty degrees and less than or equal to ninety degrees, or greater than about forty degrees and less than or equal to ninety degrees, or greater than about forty five degrees and less than or equal to ninety degrees, or greater than about fifty degrees and less than or equal to ninety degrees, or greater than about sixty degrees and less than or equal to ninety degrees, or greater than about seventy degrees and less than or equal to ninety degrees, or greater than about eighty degrees and less than or equal to ninety degrees.

In the exemplary embodiment, the first seal plate 132 is arranged in a rotational orientation that is about ninety degrees offset relative to a rotational orientation of the second seal plate 134 about the central axis 156. In other words, the first inner plate wall 160 is arranged generally perpendicularly to the second inner plate wall 172 (e.g., the intersection angle 182 is about ninety degrees). In this orientation, the first inner plate wall 160 and the first seal plate slots 162 are elongated in a direction that is generally parallel to the louver direction 148, and the second inner plate wall 172 and the second seal plate slots 174 are elongated in a direction that is generally perpendicular to the louver direction 148. With the first seal plate 132 including two of the first seal plate slots 162 and the second seal plate 134 including two of the second seal plate slots 174, the different rotational orientation between the first seal plate 132 and the second seal plate 134 about the central axis 156 defines four louver ports or passageways within the louver plate assembly 122. Specifically, the louver plate assembly 122 defines a first louver passageway 184, a second louver passageway 186, a third louver passageway 188, and a fourth louver passageway 190. In some embodiments, a number of the first seal plate slots 162 (and the corresponding number of the first static seal slots 168) and/or a number of the second seal plate slots 174 (and the corresponding number of the second static seal slots 180) may be varied to define more or less louver passageways within the louver plate assembly 122, as described herein.

Figure 4:
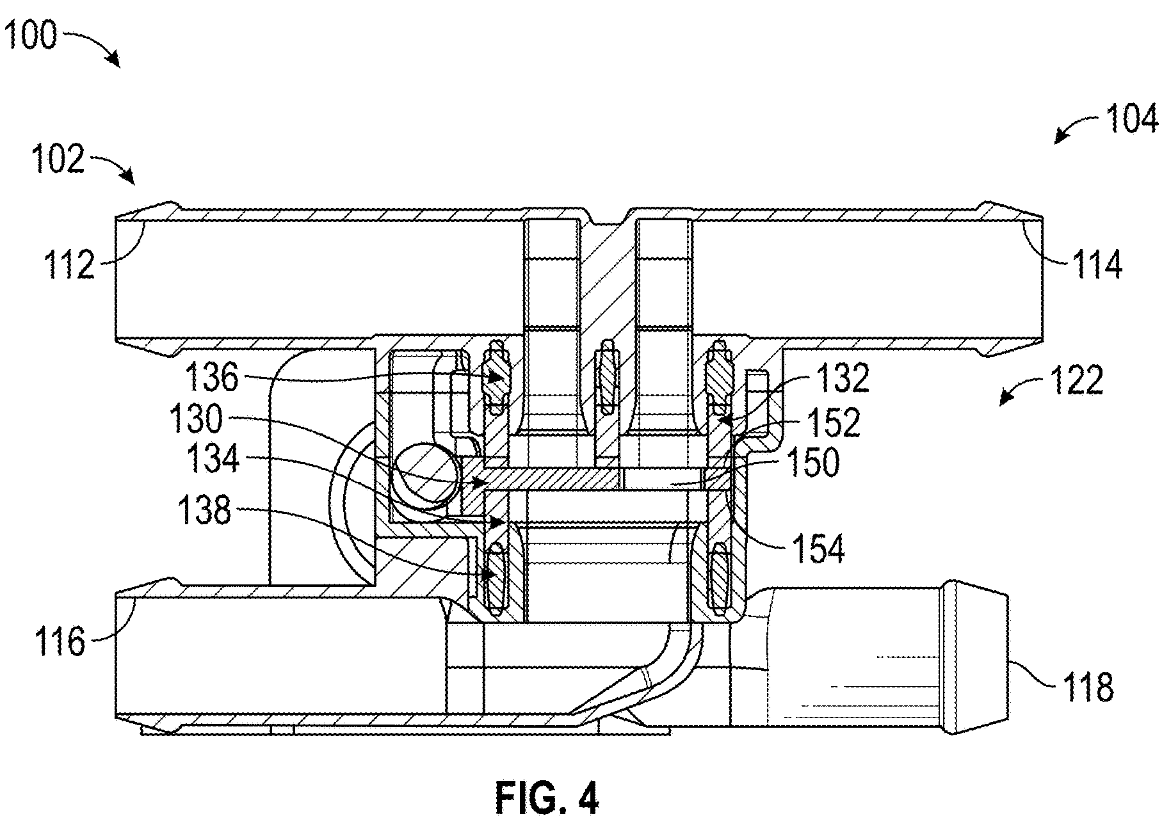
FIG. 4 is a cross-sectional view of the thermal management control valve of FIG. 1 with a louver plate in a first position.
Figure 5:
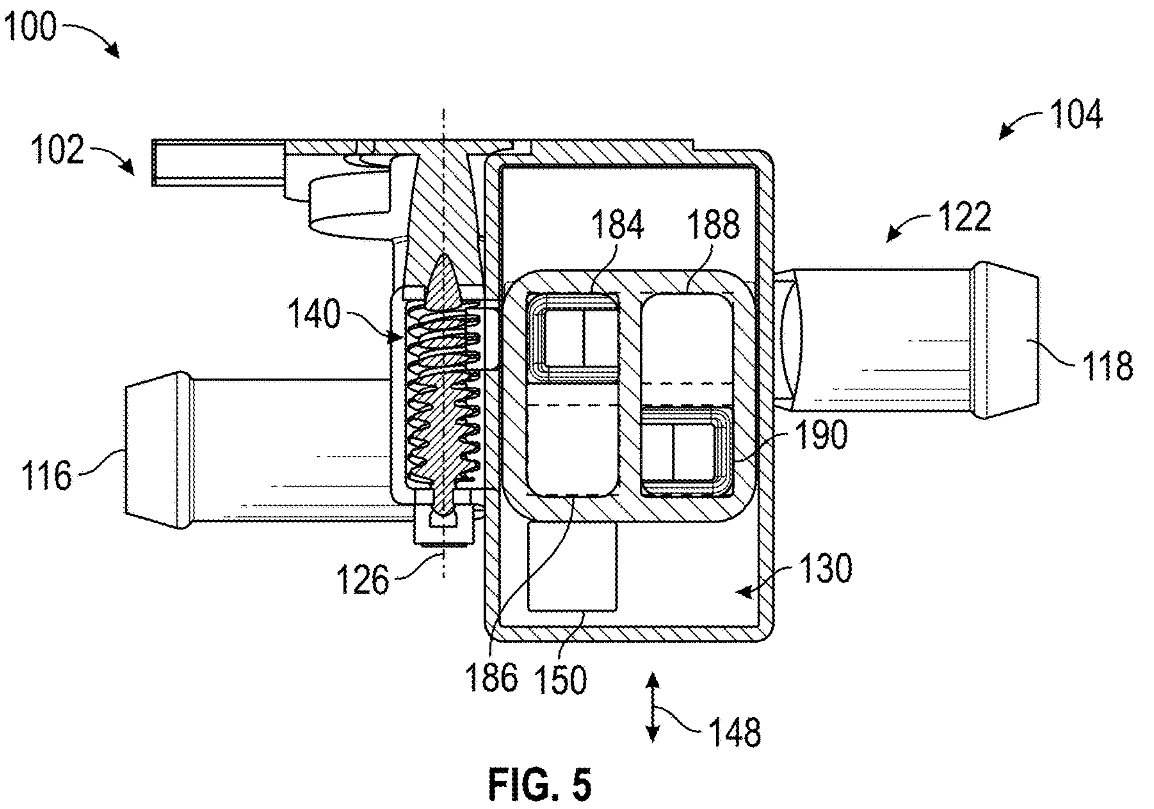
FIG. 5 is a top view of the thermal management control valve of FIG. 4 with a first housing removed.
Figure 6:
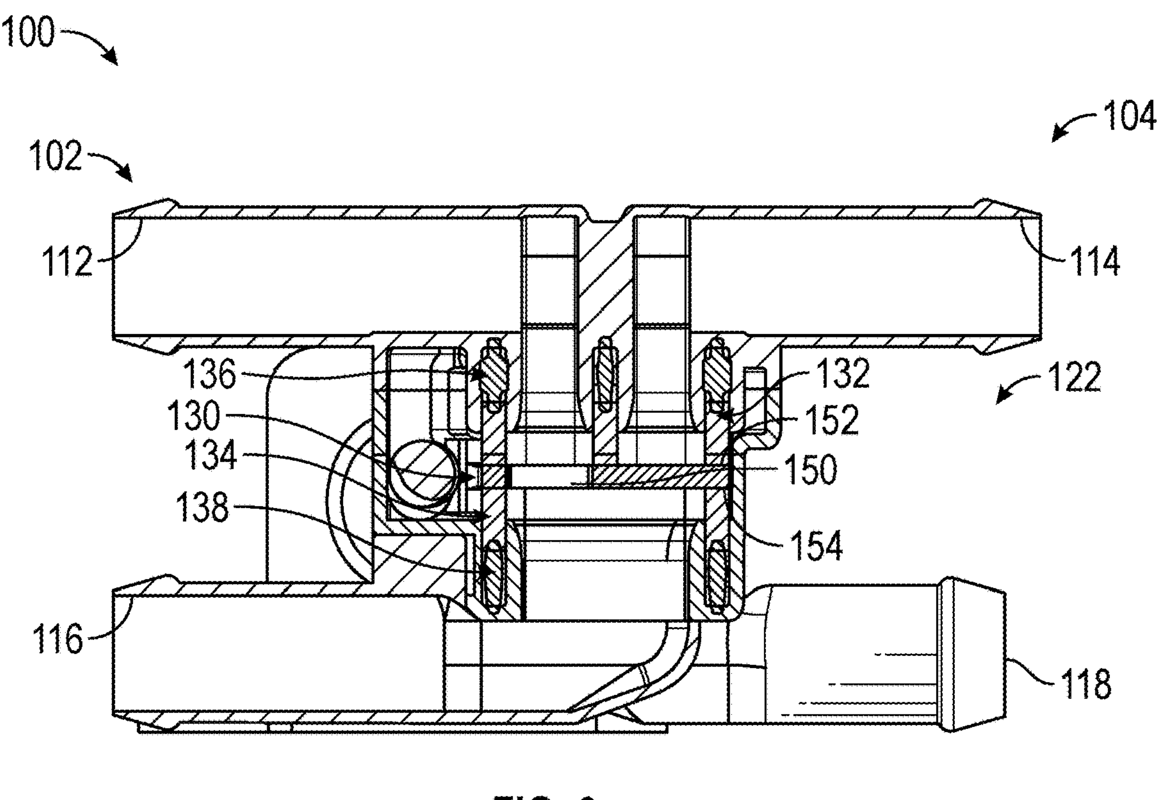
FIG. 6 is a cross-sectional view of the thermal management control valve of FIG. 1 with a louver plate in a second position.
Figure 7:
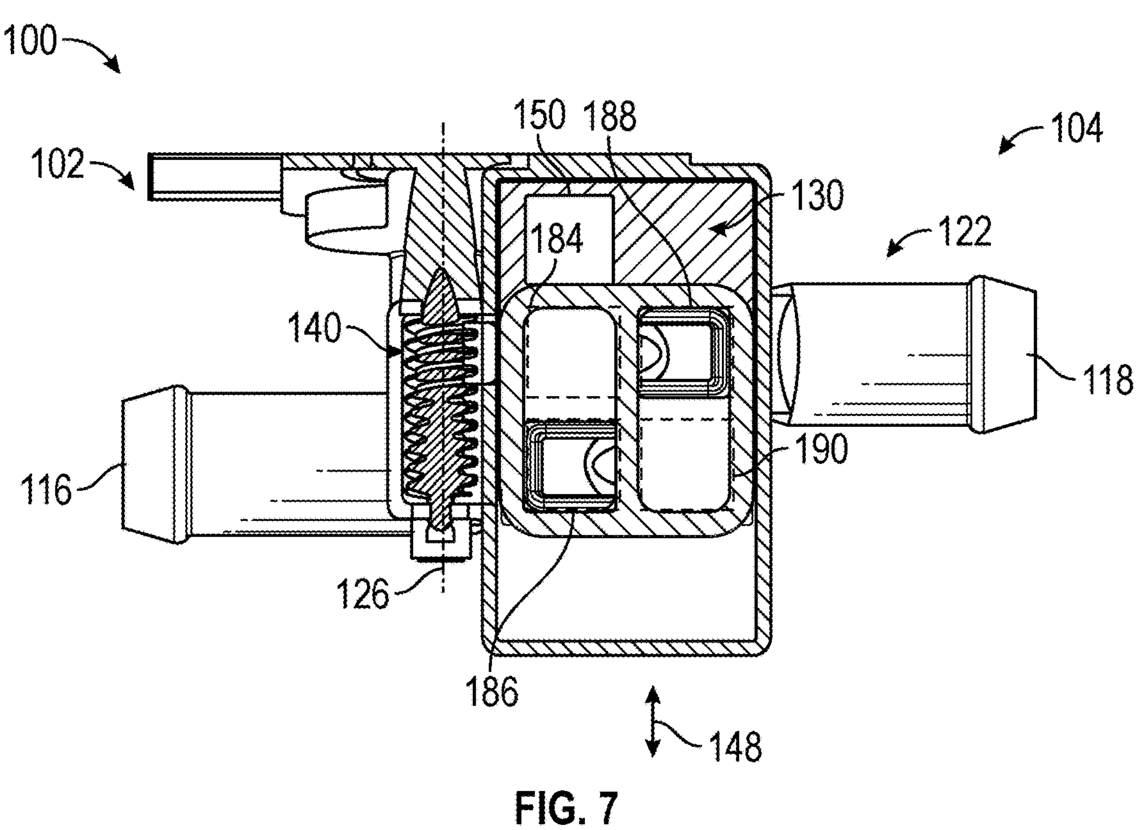
FIG. 7 is a top view of the thermal management control valve of FIG. 4 with a first housing removed.

With specific reference to FIGS. 4-7, the louver plate 130 is selectively movable along the louver direction 148, by the rotary actuator 120 and the drive shaft 124, between a first position (FIGS. 4-5) and a second position (FIGS. 6-7). The position of the louver plate 130 either selectively aligns one of the louver slots 150 or misaligns of the louver slots 150 with one or more of the first louver passageway 184, the second louver passageway 186, the third louver passageway 188, and the fourth louver passageway 190 to allow fluid flow or inhibit fluid flow along various flow paths. As shown in FIGS. 4 and 5, with the louver plate 130 in the first position, a first group of the louver slots 150 (e.g., two of the louver slots 150) open fluid flow paths through the louver plate 130. For example, one of the louver slots 150 aligns with the first louver passageway 184 and a first flow path is provided through the louver plate 130 that enables fluid communication between the first housing port 112 and the fourth housing port 118, and another of the louver slots 150 aligns with the fourth louver passageway 190 and a second flow path is provided through the louver plate 130 that enables fluid communication between the second housing port 114 and the third housing port 116. With the louver plate 130 in the first position, the second louver passageway 186 and the third louver passageway 188 are blocked by the louver plate 130 (e.g., the louver slots 150 are misaligned and do not overlap with the second louver passageway 186 or the third louver passageway 188) and fluid flow along the second louver passageway 186 (e.g., a third flow path) and the third louver passageway 188 (e.g., a fourth flow path) is inhibited.

As shown in FIGS. 6 and 7, with the louver plate 130 in the second position, a second group of the louver slots 150 (e.g., two of the louver slots 150) open fluid flow paths through the louver plate 130. For example, one of the louver slots 150 aligns with the second louver passageway 186 and a third flow path is provided through the louver plate 130 that enables fluid communication between the first housing port 112 and the third housing port 116, and another of the louver slots 150 aligns with the third louver passageway 188 and a fourth flow path is provided through the louver plate 130 that enables fluid communication between the second housing port 114 and the fourth housing port 118. With the louver plate 130 in the second position, the first louver passageway 184 and the fourth louver passageway 190 are blocked by the louver plate 130 (e.g., the louver slots 150 are misaligned and do not overlap with the first louver passageway 184 or the fourth louver passageway 190) and fluid flow along the first louver passageway 184 (e.g., the first flow path) and the fourth louver passageway 190 (e.g., the second flow path) is inhibited.

As described herein, the louver plate assembly 122 selectively provides or inhibits fluid flow along four different fluid passageways or flow paths, and the louver plate 130 is selectively movable between two different positions along the louver direction 148. In the exemplary embodiment, in each of the first position and the second position, the louver plate assembly 122 provides fluid flow through at least two of the first louver passageway 184, the second louver passageway 186, the third louver passageway 188, and the fourth louver passageway 190. Accordingly, in the exemplary embodiment, the louver plate assembly 122 provides the functionality of a 4-way, 2-position valve without requiring multiple louver plate assemblies 122 be integrated into the housing assembly 102. In this way, for example, the louver plate assembly 122 enables the thermal management control valve 100 to service additional fluid flow needs/components with a smaller packaging size. In some embodiments, the louver plate assembly 122 may provide the functionality of another valve type (e.g., 5-way, 2-position, etc.), depending one the design of the louver plate 130, the first seal plate 132, and the second seal plate 134 and the fluid connections provided thereby.

Figure 8:
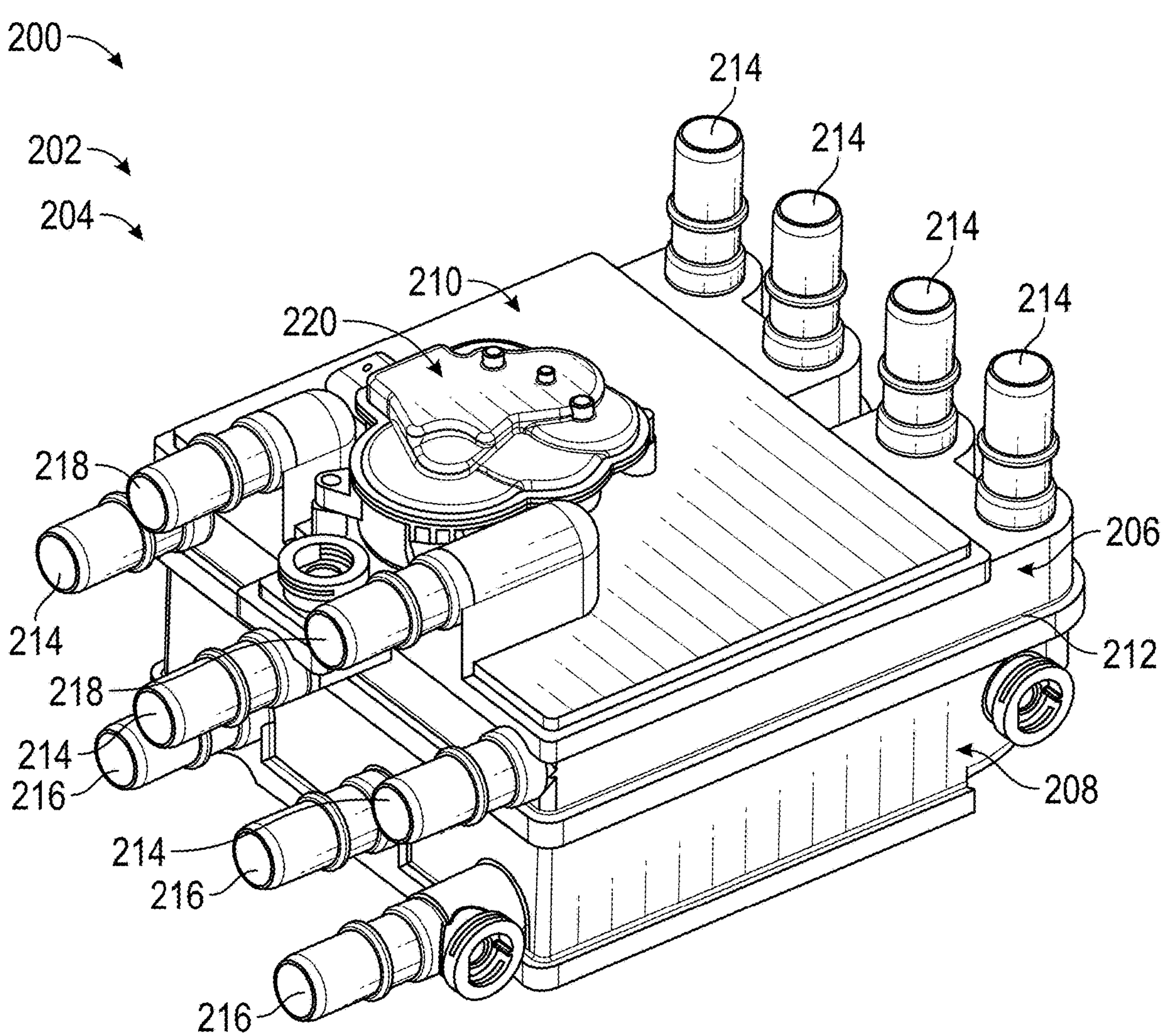
FIG. 8 is a perspective view of a thermal management control valve, according to an exemplary embodiment.
Figure 9:
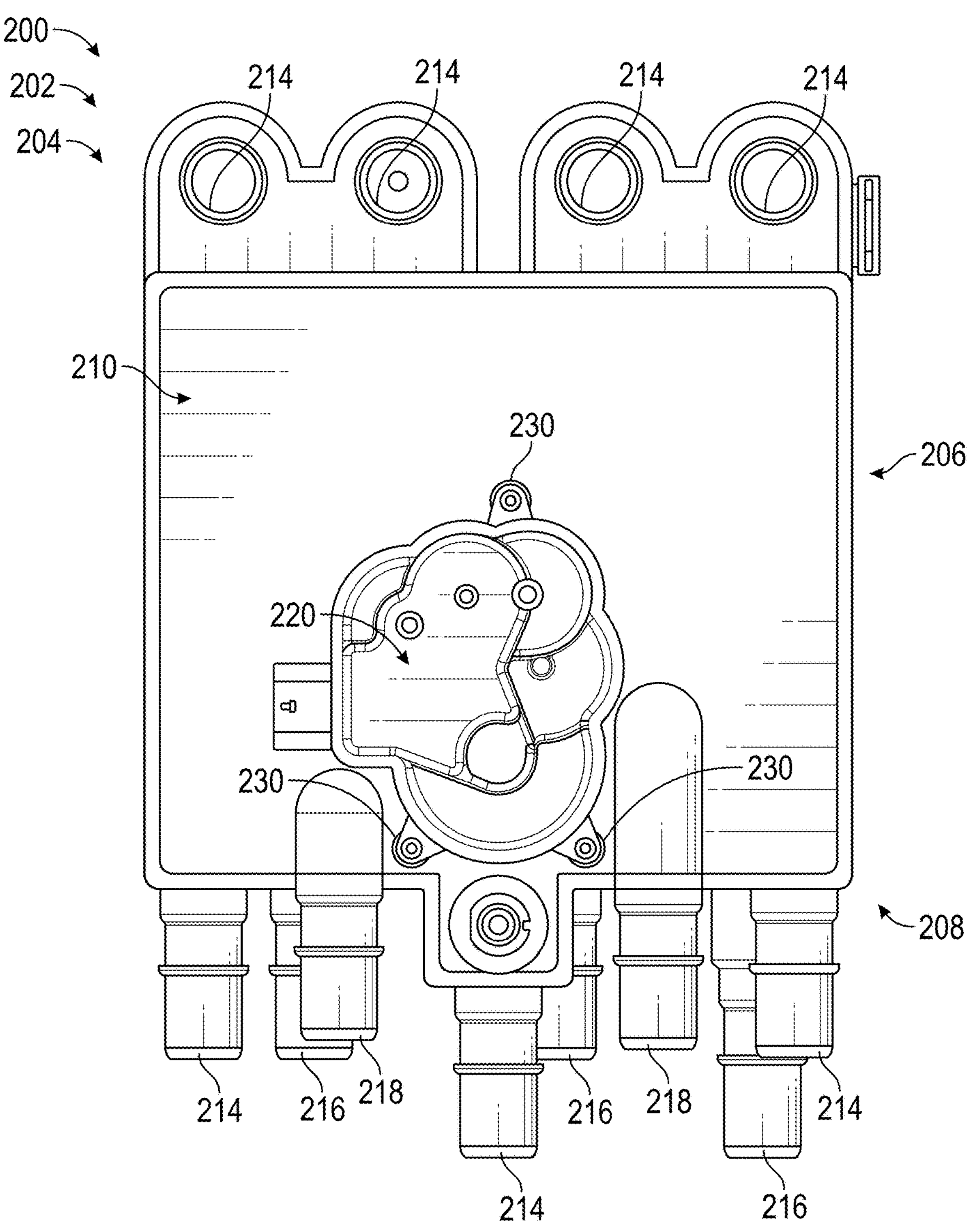
FIG. 9 is a top view of the thermal management control valve of FIG. 8.
Figure 10:
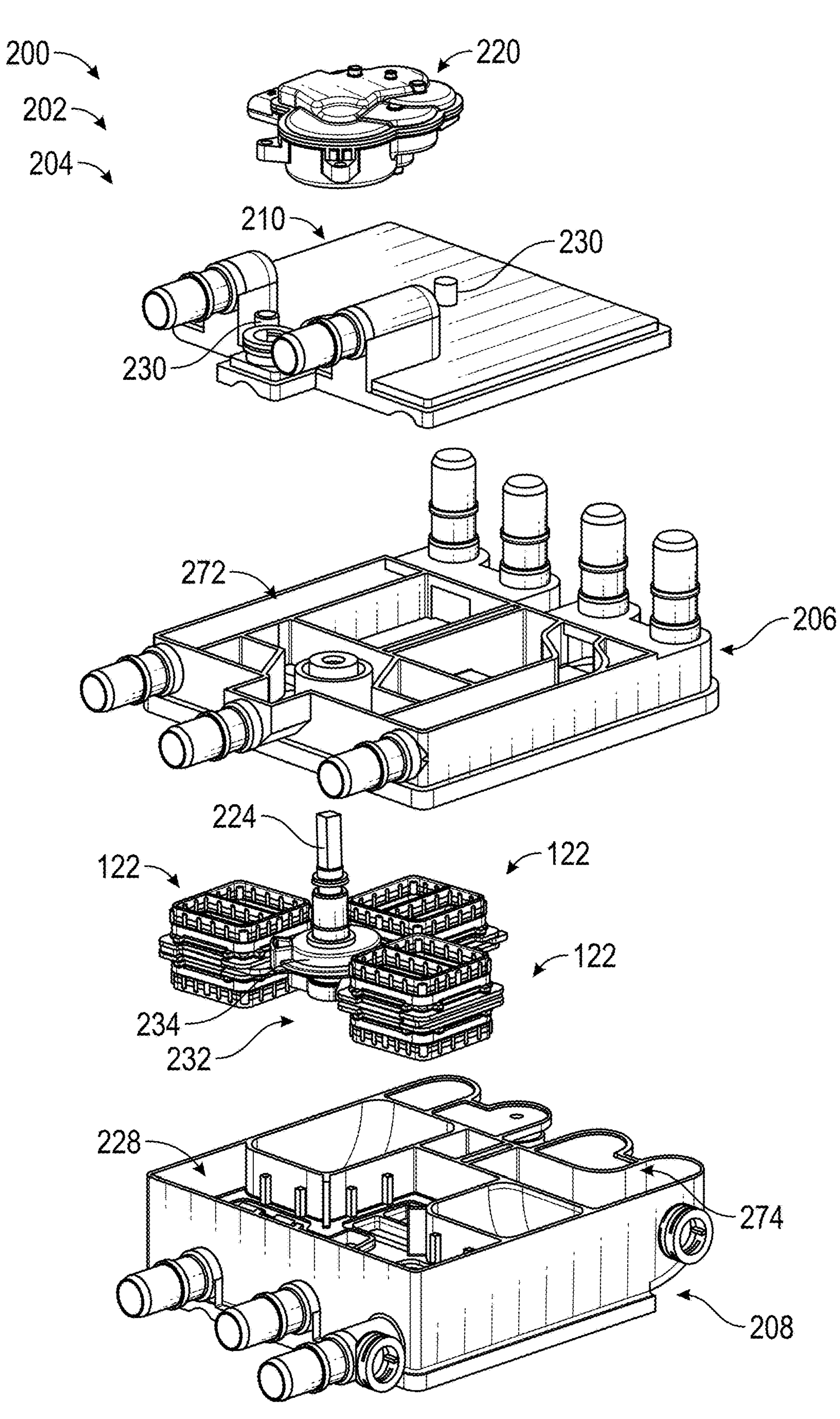
FIG. 10 is an exploded view of thermal management control valve of FIG. 8.
Figure 11:
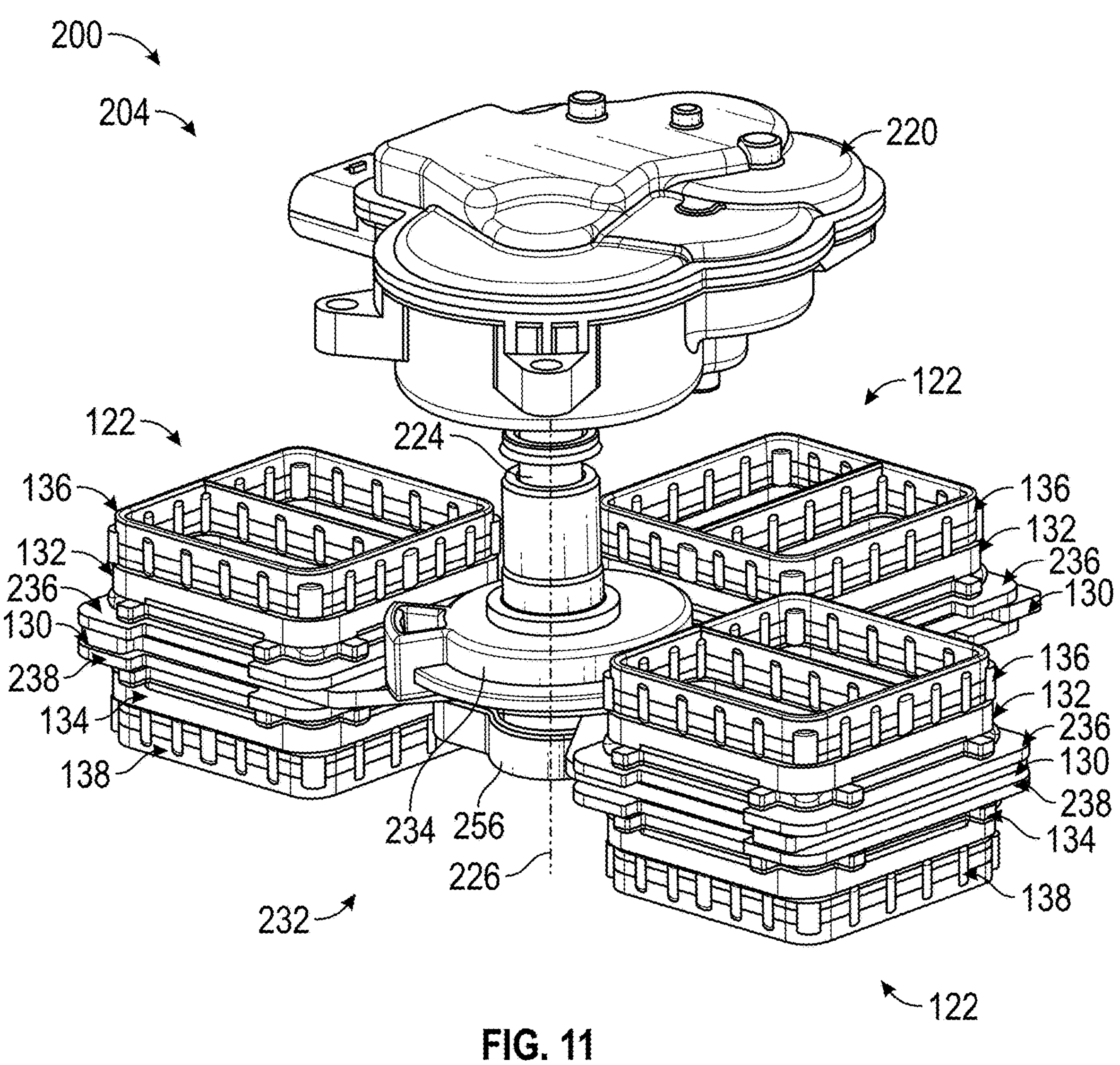
FIG. 11 is a top perspective view of a flow control assembly of FIG. 8.
Figure 12:
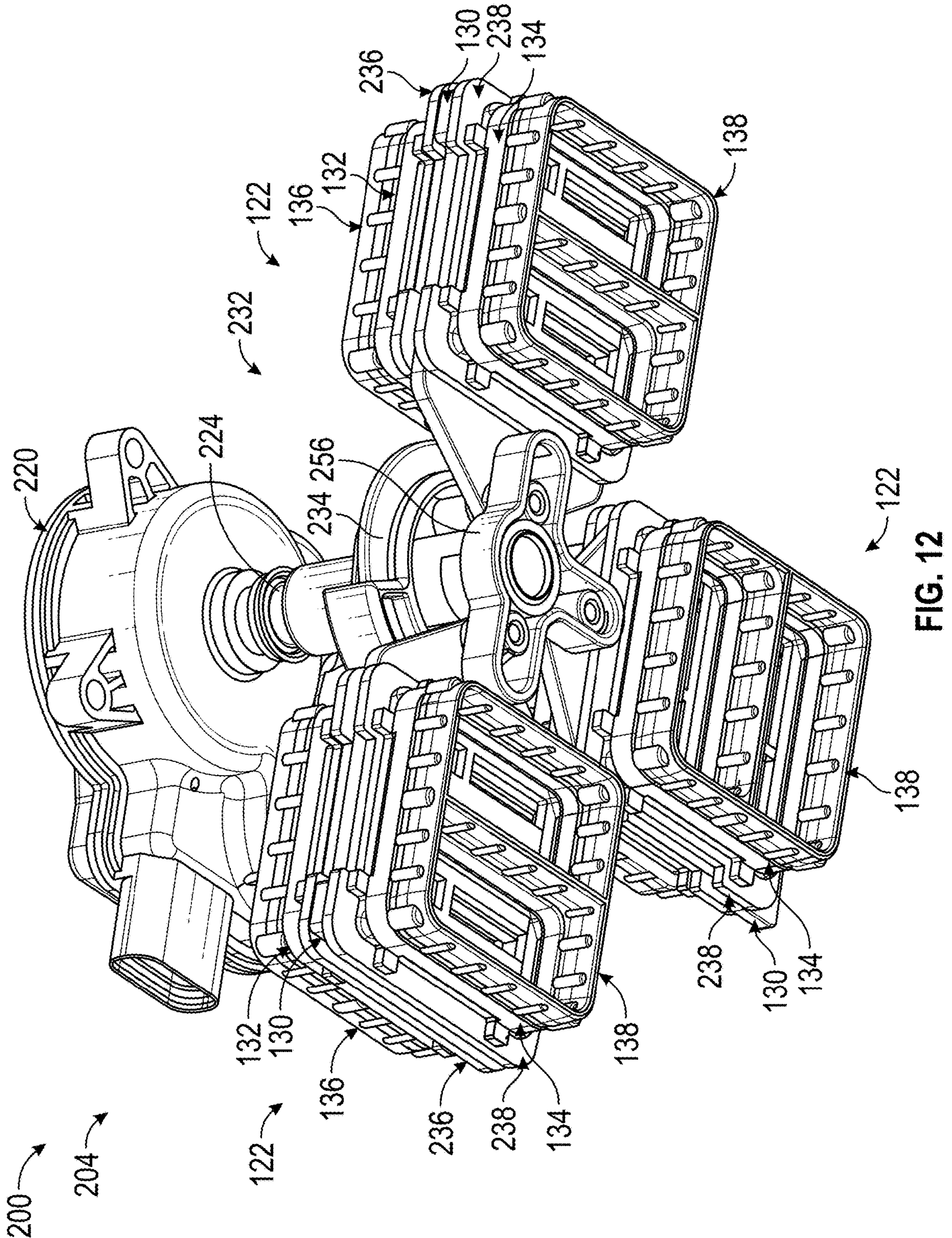
FIG. 12 is a bottom perspective view of the flow control assembly of FIG. 11.
Figure 13:
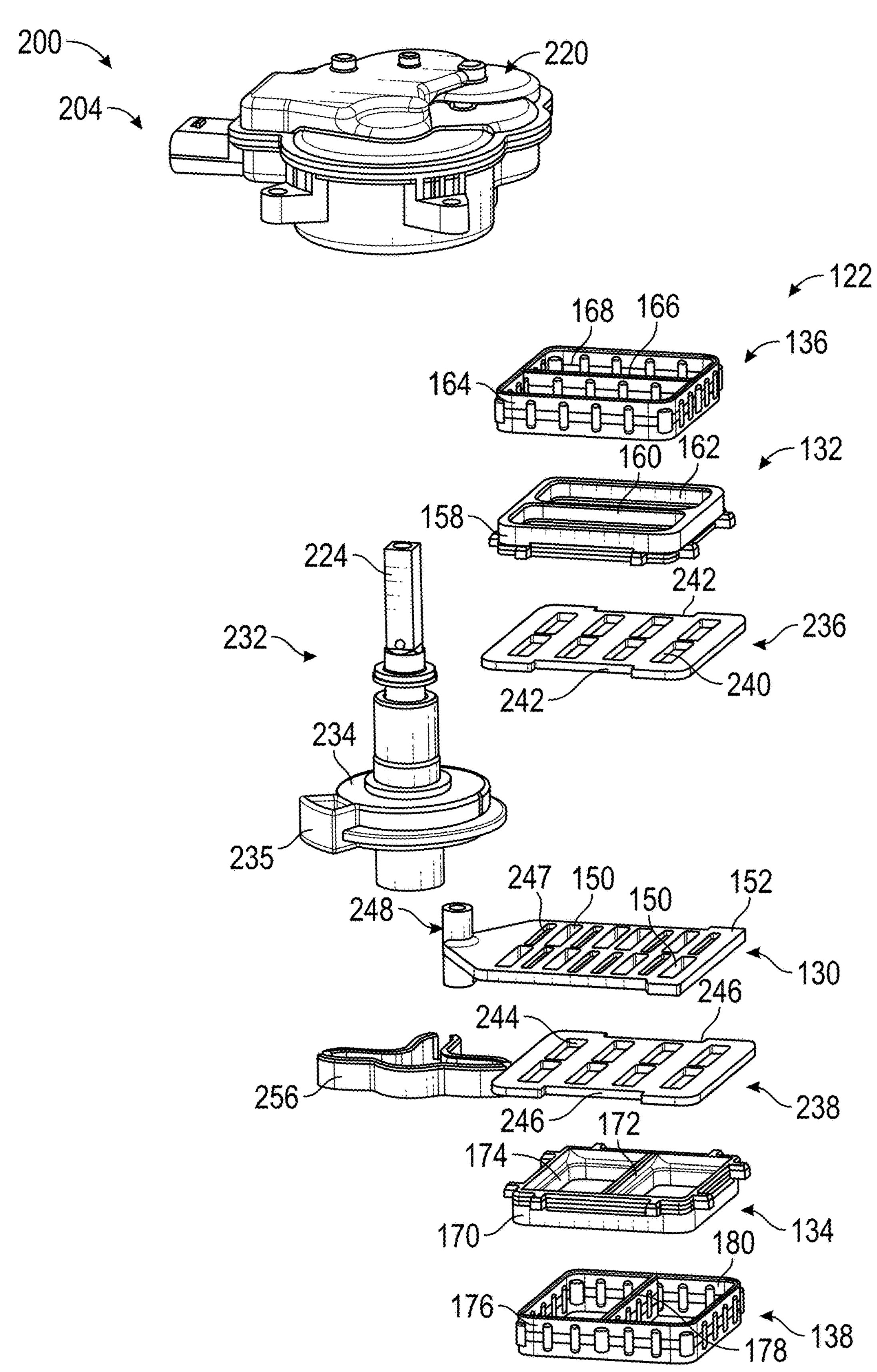
FIG. 13 is an exploded view of a louver plate assembly of the flow control assembly of FIG. 11.
Figure 14:
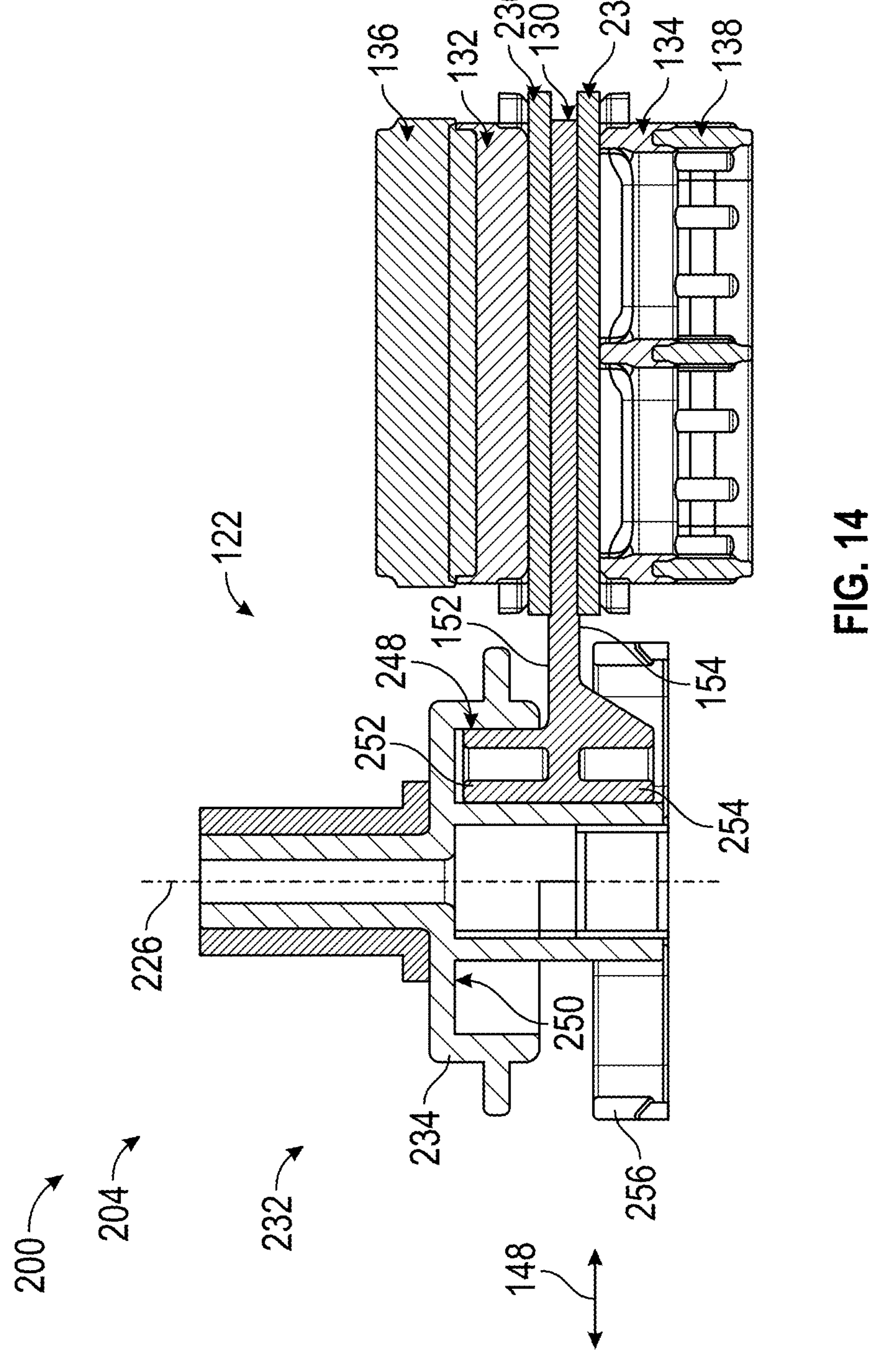
FIG. 14 is a cross-sectional view of the louver plate assembly of FIG. 13.

In some configurations, the thermal management control valve 100 may include more than one of the louver plate assembly 122 integrated within the housing assembly 102, which allows the flow control assembly 104 to control fluid flow to various fluid ports and various flow paths. FIGS. 8-10 illustrated an exemplary embodiment of a thermal management control valve 200 with a housing assembly 202 and a flow control assembly 204 that includes a plurality of the louver plate assemblies 122. In general, the design and functionality of the thermal management control valve 200 may be similar to the thermal management control valve 100, with similar features identified using like reference numerals, except as described herein or as apparent in the figures. The housing assembly 202 includes a first or upper housing section 206, a second or lower housing section 208, and a first housing cover 210. In some embodiments, the first housing section 206, the second housing section 208, and the first housing cover 210 are fabricated from a polymer or plastic material. In some embodiments, the first housing section 206, the second housing section 208, and the first housing cover 210 are manufactured via a plastic injection molding.

In general, the coupling formed between the first housing section 206 and the second housing section 208 is formed along a coplanar interface. For example, a bonding interface 212 formed between the first housing section 206 and the second housing section 208 is formed between coplanar surfaces of the first housing section 206 and the second housing section 208. Forming the bonding interface 212 between coplanar surfaces forms coplanar bonding interfaces that enable a simplified and efficient bonding processes to be utilized to form the bonds between the first housing section 206 and the second housing section 208. Additionally, forming the bonds between the first housing section 206 and the second housing section 208 along a coplanar bonding interface improves the manufacturing efficiency of the housing assembly 202.

Each of the first housing section 206, the second housing section 208, and the first housing cover 210 include one or more ports that facilitate a connection between the housing assembly 202 and a thermal management component (e.g., a heat exchanger, a pump, a check valve, a conduit/tube, etc.) or another port on an electric vehicle. In general, the housing assembly 202 may be designed to include any port configuration (e.g., number and arrangement of the ports) dictated by a particular electric vehicle application. In some embodiments, the port configuration may be quickly and efficiently changed by modifying a mold design used to plastic injection mold the housing assembly 202.

In the illustrated embodiment, the first housing section 206 includes a plurality of first ports 214, the second housing section 208 includes a plurality of second ports 216, and the first housing cover 210 includes a plurality of third ports 218. Each of the plurality of first ports 214 extends outwardly from an outer surface of the first housing section 206 and is in fluid communication with a fluid chamber or passageway within the first housing section 206. Each of the plurality of second ports 216 extends outwardly from an outer surface of the second housing section 208 and is in fluid communication with a fluid chamber or passageway within the second housing section 208. Each of the plurality of third ports 218 extends outwardly from an outer surface of the first housing cover 210 and is in fluid communication with a fluid chamber or passageway within the first housing section 206. In some embodiments, a second housing cover is coupled to a bottom surface (e.g., a surface opposite to the first housing section 206) of the second housing section 208. In some embodiments, another housing section that includes additional fluid ports is coupled to a bottom surface of the second housing section 208.

In general, the flow control assembly 204 is configured to selectively control fluid flow between the ports in the housing assembly 102 (e.g., the plurality of first ports 214, the plurality of second ports 216, the plurality of third ports 218) and the fluid chambers or passageways arranged within the housing assembly 102. The flow control assembly 204 includes a rotary actuator 220 (e.g., a rotary motor, a stepper motor, an electric motor, etc.) and a plurality of the louver plate assemblies 122. The rotary actuator 220 is coupled to a drive shaft 224 and the rotary actuator 220 is configured to rotate in a predetermined direction and a predetermined magnitude (e.g., a predetermined rotational distance) in response to energization of the rotary actuator 220. The drive shaft 224 defines a drive axis 226 and extends into a louver cavity or chamber, shown as louver manifold 228 formed within the housing assembly 102. For example, a portion of the louver manifold 228 may be formed by the first housing section 206 and a portion of the louver manifold 228 may be formed by the second housing section 208. When the first housing section 206 is installed on the second housing section 208, the respective portions of the louver manifold 228 formed by the first housing section 206 and the second housing section 208 define an enclosure that forms the louver manifold 228 and houses the components of each of the louver plate assemblies 122.

In the illustrated embodiment, the rotary actuator 220 is coupled to the housing assembly 102 by actuator mounting posts 230 that extend outwardly from the first housing cover 210, so that the rotary actuator 220 is supported on the first housing cover 210. The drive shaft 224 extends into the housing assembly 102 (e.g., through the first housing cover 210 and the first housing section 206, and into the louver manifold 228) at a location that is offset (e.g., does not intersect with) from the bonding interface 212 formed between the first housing section 206 and the second housing section 208. In other words, an entirety of the drive shaft 224 is offset from the bonding interface 212. This offset arrangement of the drive shaft 224 enables the bonding interface 212 to maintain its coplanar orientation and the associated manufacturing advantages associated therewith. For example, the bonding interface 212 is not required to form a seal around a split interface that curves around opposing sides of the drive shaft 224.

Turning to FIGS. 11-18, the flow control assembly 204 and the louver plate assemblies 122 are shown in more detail. In general, each of the louver plate assemblies 122 may include similar components and functionality, with like components identified with the same reference numerals, except as described herein or as apparent from the figures. It follows that any description of a single the louver plate assembly 122 illustrated in FIGS. 11-18 generally applies to each of the louver plate assemblies 122 of the flow control assembly 204.

In the illustrated embodiment, the drive shaft 224 is coupled to a cam 232, and the cam 232 is coupled to each of the louver plate assemblies 122. In general, the cam 232 is configured to convert rotational motion of the drive shaft 224, driven by the rotary actuator 220, into linear motion of the louver plate assemblies 122. The cam 232 includes a cam wheel 234 is that coupled to the drive shaft 224. In some embodiments, the cam wheel 234 is formed as a unitary component (e.g., integrally formed) with the drive shaft 224. In some embodiments, the cam wheel 234 is formed as a separate component and rotationally keyed to the drive shaft 224 for rotation therewith. In any case, rotation of the drive shaft 224 results in the same rotation (e.g., direction and magnitude) of the cam wheel 234. The cam wheel 232 includes a cam protrusion or stop 235 that protrudes radially outwardly from an outer surface of the cam wheel 232. In general, the cam stop 235 is configured to engage a mechanical stop or structure within the housing assembly 102 to limit the rotational movement of the cam wheel 232.

In the illustrated embodiment, the flow control assembly 204 includes three of the louver plate assemblies 122, with the louver plate assemblies 122 being circumferentially spaced (e.g., about the drive axis 226) in ninety degree increments. In some embodiments, the flow control assembly 204 may includes more or less than three of the louver plate assemblies 122 spaced in any circumferential or axial increment relative to the drive axis 226. In the illustrated embodiment, each of the louver plate assembly 122 includes a first static seal plate 236 and a second static seal plate 238. When the louver plate assemblies 122 are assembled, the first static seal plate 236 is arranged between the louver plate 130 and the first seal plate 132 (e.g., in a direction along the central axis 156), and the second static seal plate 238 is arranged between the louver plate 130 and the second seal plate 134. In this arrangement, the first static seal plate 236 seals against the upper or first louver surface 152 of the louver plate 130, and the first seal plate 132 is sealed between the first static seal plate 236 and the first static seal 136. Similarly, the second static seal plate 238 is sealed against the lower or second louver surface 154 of the louver plate 130, and the second seal plate 134 is sealed between the second static seal plate 238 and the second static seal 138.

In the illustrated embodiment, the first static seal plate 236 includes a plurality of apertures, holes, cutouts, shown as a plurality of first static seal plate slots 240 and a pair of mounting notches 242 that are recessed into opposing outer surfaces of the first static seal plate 236. Each of the plurality of first static seal plate slots 240 extends through the first static seal plate 236 to define a flow path therethrough. In the illustrated embodiment, the plurality of first static seal plate slots 240 are arranged in an array that includes eight of the first static seal plate slots 240. In some embodiments, the first static seal plate 236 may include more or less than eight of the first static seal plate slots 240. Similarly, the second static seal plate 238 includes a plurality of apertures, holes, cutouts, shown as a plurality of second static seal plate slots 244 and a pair of mounting notches 246 that are recessed into opposing outer surfaces of the second static seal plate 238. Each of the plurality of second static seal plate slots 244 extends through the second static seal plate 238 to define a flow path therethrough. In the illustrated embodiment, the plurality of second static seal plate slots 244 are arranged in an array that includes eight of the second static seal plate slots 244. In some embodiments, the second static seal plate 238 may include more or less than eight of the second static seal plate slots 244.

The mounting notches 242 and the mounting notches 246 aid in constraining and aligning the first static seal plate 236 and the second static seal plate 238 within the louver manifold 228 during assembly, as described herein. When the louver plate assembly 122 is assembled, each of the plurality of first static seal plate slots 240 aligns with (e.g., in a direction along the central axis 156) a corresponding one of the plurality of second static seal plate slots 244. In general, the inclusion of the first static seal plate 236 and the second static seal plate 238 within the louver plate assembly 122 provides enhanced control over the timing of the opening and/or closing of the various fluid passageways formed by the louver plate assembly 122, as the louver plate 130 travels between the first position and the second position.

In the illustrated embodiment, the louver plates 130 each include an array of the louver slots 150 that includes eight of the louver slots 150. In some embodiments, the louver plate 130 includes more or less than eight of the louver slots 150, with the louver slots 150 arranged on the louver plate 130 in various orientations and spacings. In the illustrated embodiment, the louver plate 130 includes a plurality of contamination grooves or recesses 247, each being arranged in between or adjacent to at least one of the louver slots 150 on both the upper or first louver surface 152 and the lower or second louver surface 154 (see, e.g., FIGS. 17 and 18). Each of the contamination grooves 247 is recessed into one of the upper or first louver surface 152 or the lower or second louver surface 154, but does not extend all the way through the louver plate 130. During operation, the contamination grooves 247 provide a location for potential contaminates to concentrate, which limits (e.g., prevents) contamination build up near the louver slots 150 (e.g., along the edges of the louver slots 150 that are used for flow metering).

In the illustrated embodiment, the louver plates 130 each includes a bearing or tube, shown a pin 248 that is arranged at an end of the louver plate 130. In general, at least a portion of the pin 248 extend axially into (e.g., in a direction parallel to the drive axis 226) and is received within a cam slot 250 formed in the cam wheel 234. In the illustrated embodiment, the a first end or portion 252 of the pin 248 extends axially into and is received within the cam slot 250, and a second end or portion 254 of the pin 248 extends axially into and is received within a guide frame 256. The guide frame 256 defines a channel or slot that receives the second portion 254 and aids in guiding the pin 248 and the louver plate 130 along the louver direction 148 as the louver plate 130 is moved by the cam 232.

In general, rotation of the cam wheel 234 may provide linear movement of the louver plate 130 along the louver direction 148. In the illustrated embodiment, the louver direction 148 is perpendicular to the drive axis 226. During operation, the rotary actuator 220 selectively rotates the drive shaft 224 and the cam wheel 234 rotates with the drive shaft 224 so that the cam slot 250 rotates relative to the louver plate 130. The relative rotation between the cam slot 250 and the louver plate 130 results in the cam slot 250 moving circumferentially about the drive axis 226 and relative to the pin 248 (e.g., each of the pins 248 received within the cam slot 250). The cam slot 250 defines a geometry with a variable radius (e.g., relative to the drive axis 226) that, during rotation of the cam slot 250 relative to the pin 248, either maintains a position of the louver plate 130 along the louver direction 148 or moves the louver plate 130 (e.g., pushing or pulling) along the louver direction 148 so that the various fluid passageways formed by the louver plate assembly 122 are selectively opened or closed.

Figure 15:
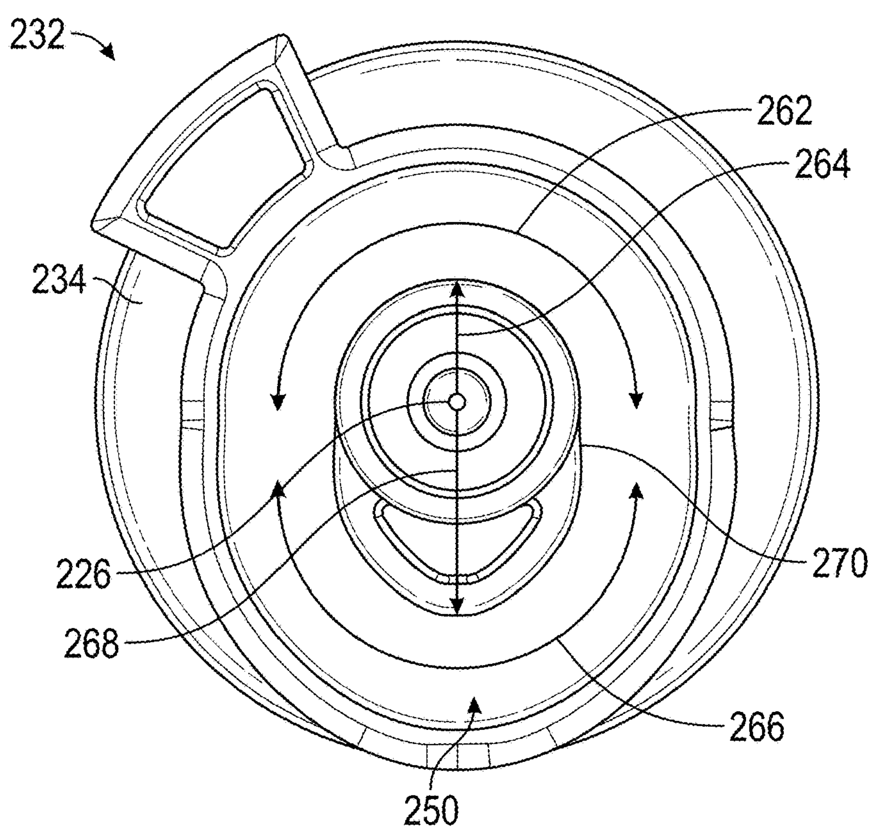
FIG. 15 is a bottom view of a cam wheel of the flow control assembly of FIG. 11.
Figure 16:
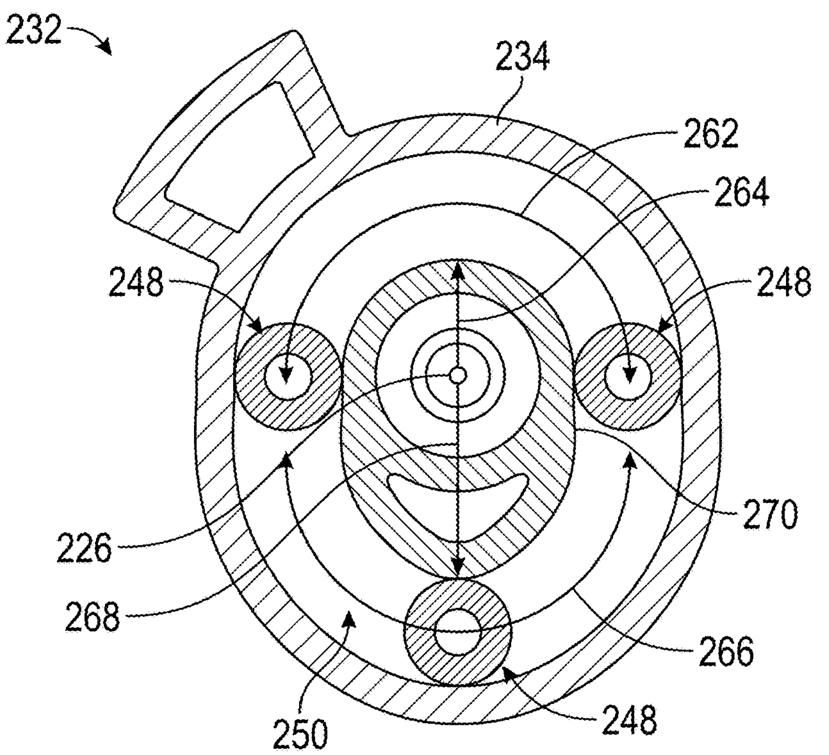
FIG. 16 is a cross-sectional view of the cam wheel of FIG. 15 with louver pins arranged within the cam wheel.

With specific reference to FIGS. 15 and 16, the cam slot 250 may be designed to include a radial profile with a radius (e.g., relative to the drive axis 226) that varies in at least one section of the cam slot 250. It should be appreciated that the cam slot 250 illustrated in FIGS. 15 and 16 is not meant to be limiting and the cam slot 250 may be designed to include any radial profile to accommodate a particular thermal management application (i.e., opening and closing of the louver plates 130 for a particular duration at a particular time). In the illustrated embodiment, the cam slot 250 defines a continuous slot that extends circumferentially around the drive axis 226 (e.g., three hundred and sixty degrees around the drive axis 226). The cam slot 250 defines a first portion 262 at a first circumferential position that extends a first radial distance 264 from the drive axis 226 and a second portion 266 at a second circumferential position that extends a second radial distance 268 from the drive axis 226. In general, the first radial distance 264 is different than the second radial distance 268. In the illustrated embodiment, the first radial distance 264 and the second radial distance 268 are defined between the drive axis 226 and a radially-inner side surface 270 of the cam slot 250. In some embodiments, the radial distance that the cam slot 250 extends relative to the drive axis 226 may be defined between the drive axis 226 and a radially-outer second side surface of the cam slot 250, or between the drive axis 226 and a centerline defined along the cam slot 250 (e.g., a radial centerline between the radially-inner side surface 270 and the radially-outer side surface). In the illustrated embodiment, the first radial distance 264 is less than the second radial distance 268. In general, the transition between the first radial distance 264 and the second radial distance 268 (and vice versa) results in the pin 248 of the louver plate 130 being pushed or pulled along the louver direction 148, and the louver plate 130 is moved between the first position and the second position (or vice versa).

Figure 17:
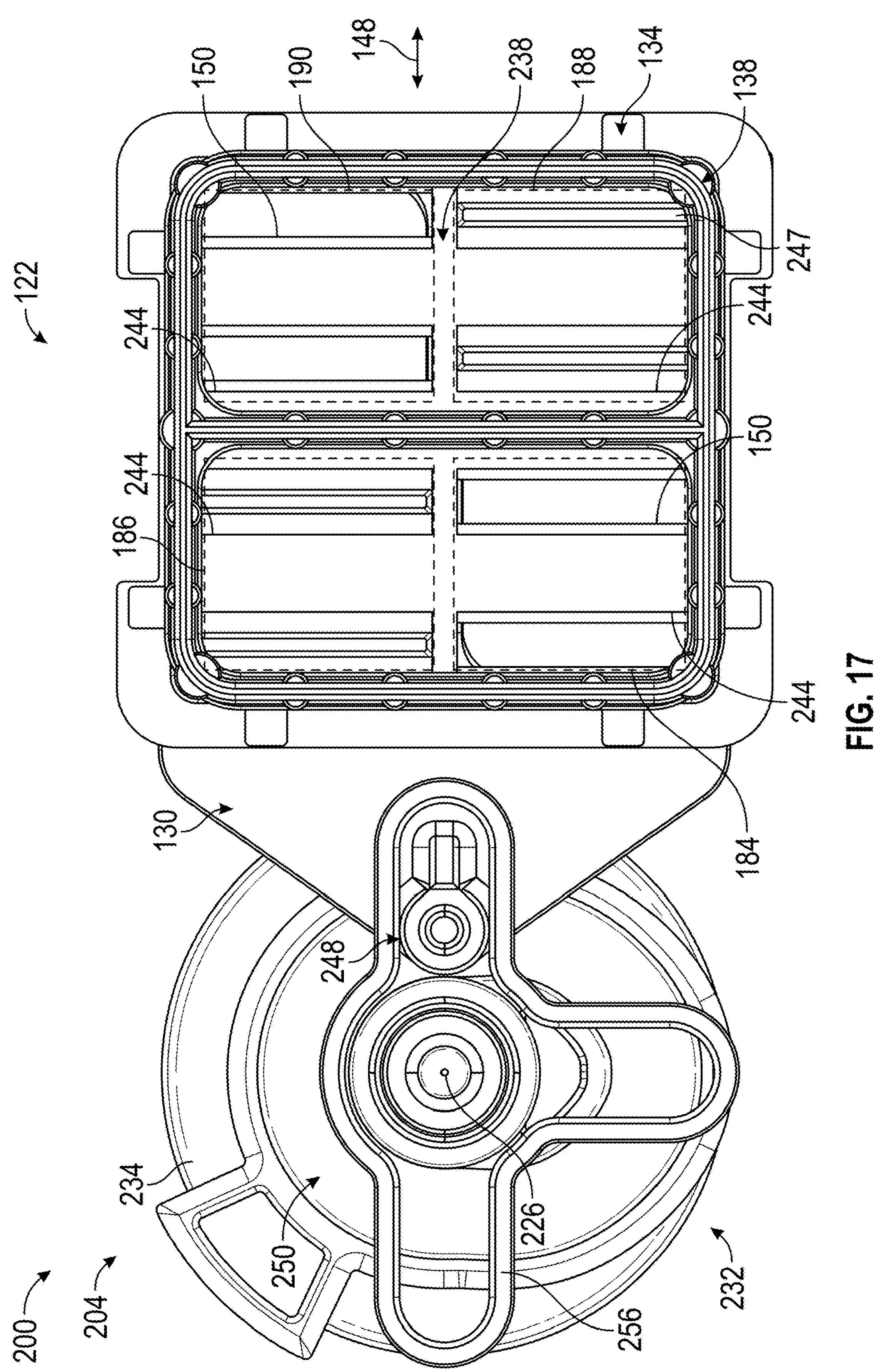
FIG. 17 is a bottom view of the louver plate assembly of FIG. 11 with a louver plate in a first position.
Figure 18:
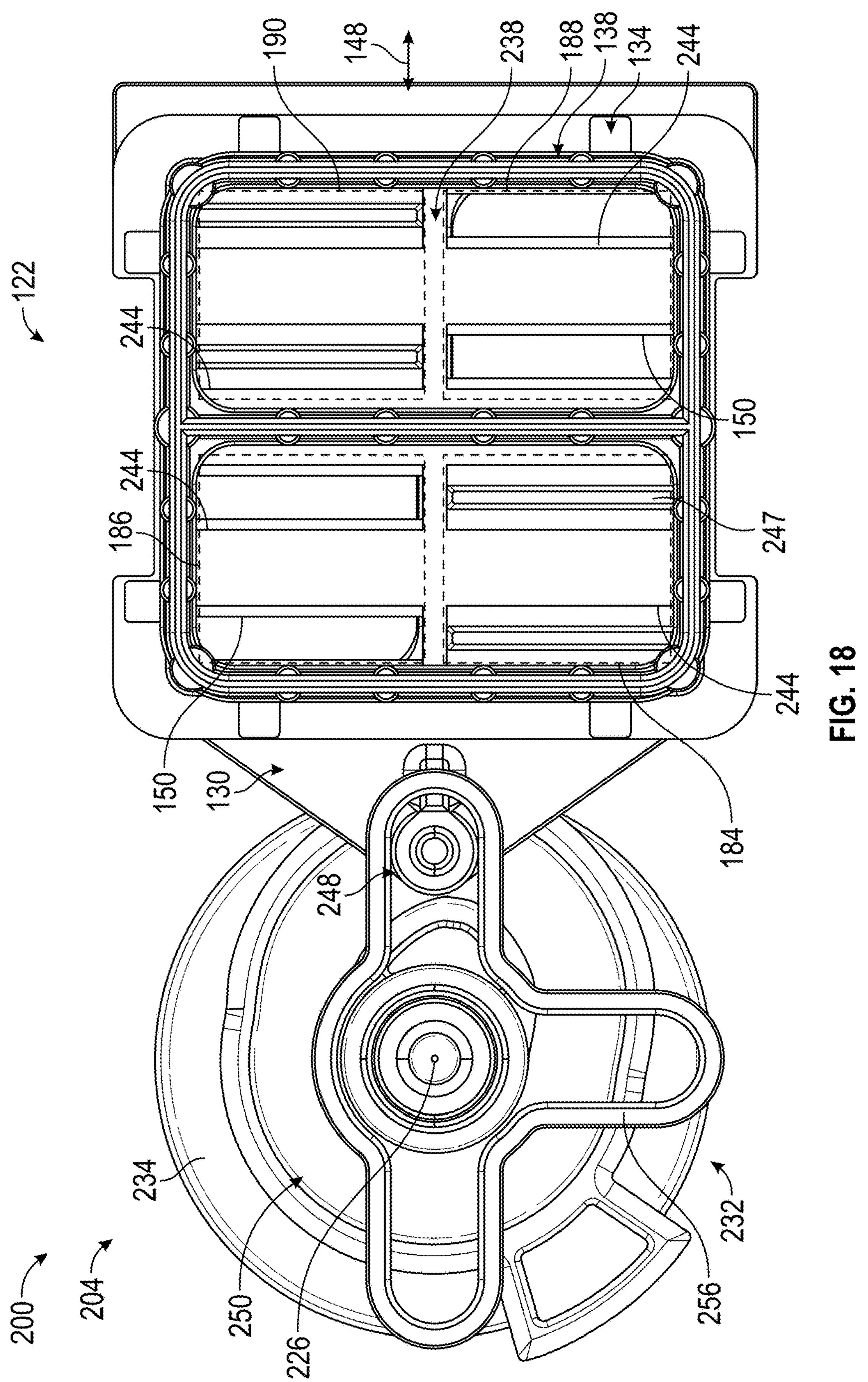
FIG. 18 is a bottom view of the louver plate assembly of FIG. 11 with a louver plate in a second position.

Turning to FIGS. 17 and 18, the louver plate assembly 122 defines the first louver passageway 184, the second louver passageway 186, the third louver passageway 188, and the fourth louver passageway 190, as described herein. The movement of the louver plate 130 between the first position and the second position either selectively aligns a set of the louver slots 150 with both a corresponding set of the plurality of first static seal plate slots 240 and a corresponding set of the plurality of second static seal plate slots 244, or misaligns or blocks both a corresponding set of the plurality of first static seal plate slots 240 and a corresponding set of the plurality of second static seal plate slots 244 to provide or inhibit fluid flow through one or more of the first louver passageway 184, the second louver passageway 186, the third louver passageway 188, and the fourth louver passageway 190.

As shown in FIG. 17, with the louver plate 130 in the first position, one pair of the louver slots 150 aligns with both a corresponding pair of the plurality of first static seal plate slots 240 and a corresponding pair of the plurality of second static seal plate slots 244 and, thereby, opens the first louver passageway 184 and a first flow path is provided through the louver plate 130. Additionally, another pair of the louver slots 150 aligns with both another corresponding pair of the plurality of first static seal plate slots 240 and another corresponding pair of the plurality of second static seal plate slots 244 and, thereby, opens the fourth louver passageway 190 and a second flow path is provided through the louver plate 130. With the louver plate 130 in the first position, the second louver passageway 186 and the third louver passageway 188 are blocked by the louver plate 130 (e.g., the corresponding plurality of first static seal plate slots 240 and the corresponding plurality of second static seal plate slots 244 that align with the second louver passageway 186 and the third louver passageway 188 are blocked by the louver plate 130) and fluid flow along the second louver passageway 186 (e.g., a third flow path) and the third louver passageway 188 (e.g., a fourth flow path) is inhibited.

As shown in FIG. 18, with the louver plate 130 in the second position, one pair of the louver slots 150 aligns with both a corresponding pair of the plurality of first static seal plate slots 240 and a corresponding pair of the plurality of second static seal plate slots 244 and, thereby, opens the second louver passageway 186 and a third flow path is provided through the louver plate 130. Additionally, another pair of the louver slots 150 aligns with both another corresponding pair of the plurality of first static seal plate slots 240 and another corresponding pair of the plurality of second static seal plate slots 244 and, thereby, opens the third louver passageway 188 and a fourth flow path is provided through the louver plate 130. With the louver plate 130 in the second position, the first louver passageway 184 and the fourth louver passageway 190 are blocked by the louver plate 130 (e.g., the corresponding plurality of first static seal plate slots 240 and the corresponding plurality of second static seal plate slots 244 that align with the first louver passageway 184 and the fourth louver passageway 190 are blocked by the louver plate 130) and fluid flow along the first louver passageway 184 (e.g., the first flow path) and the fourth louver passageway 190 (e.g., the second flow path) is inhibited.

In general, the opening and closing of the flow paths along the first louver passageway 184, the second louver passageway 186, the third louver passageway 188, and the fourth louver passageway 190, by selective movement of the louver plate 130, selectively provides or inhibits fluid communication between internal fluid chambers or passageways formed within the housing assembly 202. With reference to FIGS. 10 and 19-21, the first housing section 206 includes a plurality of first internal fluid passageways 272 formed by internal walls within the first housing section 106. Each of the plurality of first internal fluid passageways 272 is in fluid communication with at least one of the plurality of first ports 214, the plurality of second ports 216, or the plurality of third ports 218. The second housing section 208 includes a plurality of second internal fluid passageways 274 formed by internal walls within the second housing section 208. Each of the plurality of second internal fluid passageways 274 is in fluid communication with at least one of the plurality of first ports 214, the plurality of second ports 216, or the plurality of third ports 218.

Figure 19:
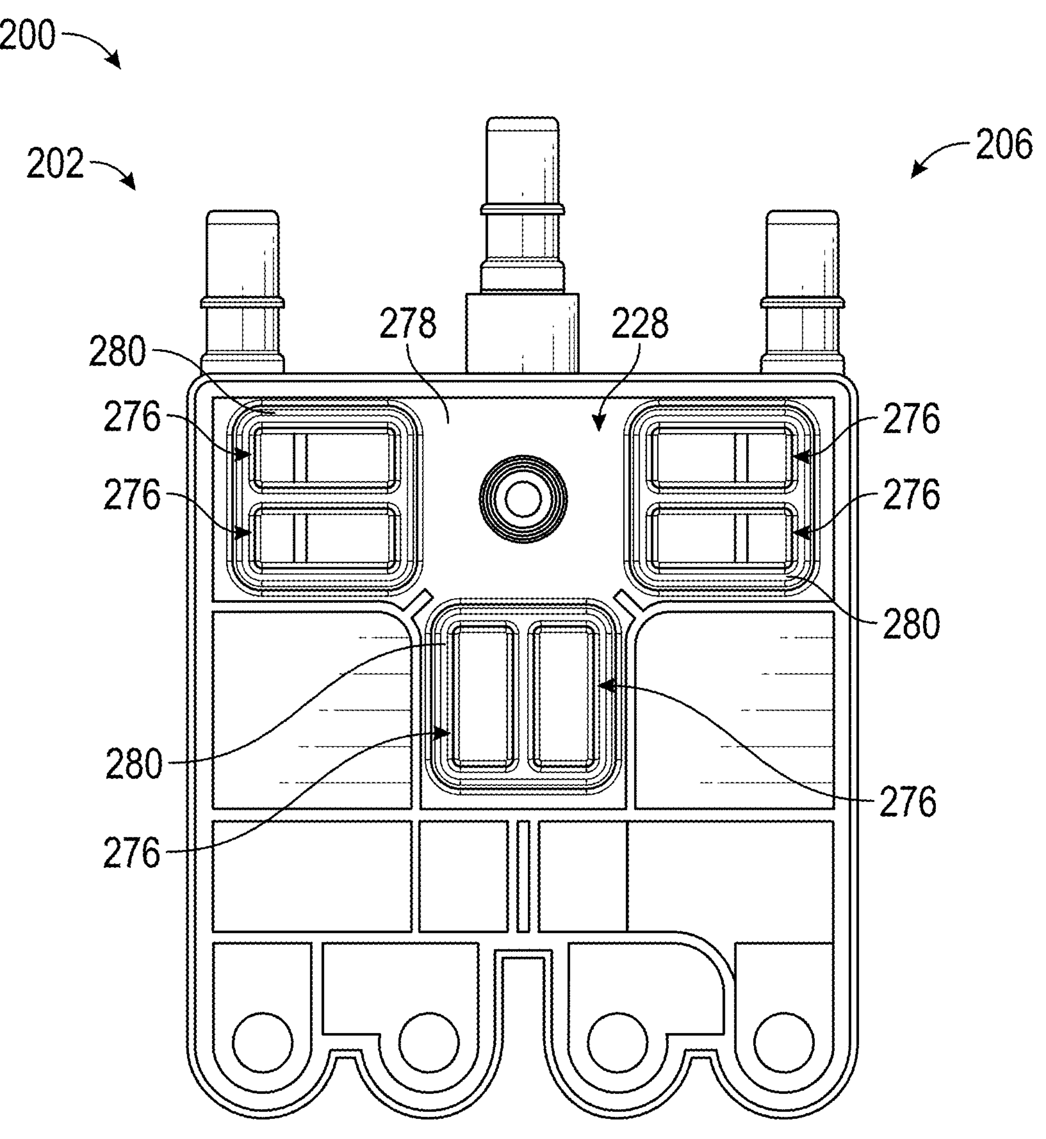
FIG. 19 is a bottom view of a first housing of the thermal management control valve of FIG. 8.

The first housing section 206 includes a plurality of first housing ports 276 that extend through a first internal wall 278 of the louver manifold 228 (see, e.g., FIG. 19). In the illustrated embodiment, each of the plurality of first housing ports 276 are arranged in pairs and shaped to conform with the shape defined by the first seal plates 132 and the second seal plate 134. Each pair of the plurality of first housing ports 276 is bordered by a first louver recess 280 that is dimensioned to at least partially receive a corresponding one of the second seal plates 134 therein. The second housing section 208 includes a plurality of second housing ports 282 that extend through a second internal wall 284 of the louver manifold 228 (see, e.g., FIG. 20). In the illustrated embodiment, each of the plurality of second housing ports 282 are arranged in pairs and shaped to conform with the shape defined by the second seal plate 134 and the second static seal 138. Each pair of the plurality of second housing ports 282 is bordered by a second louver recess 286 that is dimensioned to at least partially receive a corresponding one of the second static seals 138 therein. Each of the louver plate assembly 122 provides a sealed fluid connection between the plurality of first housing ports 276 and the louver plates 130, and between the first internal wall 278 and the louver plate 130. As such, the louver plate assemblies 122 are configured to selectively provide or inhibit fluid flow between selective groups of the plurality of first housing ports 276 and the plurality of second housing ports 282, and thereby along selective flow paths that include one or more of the plurality of first internal fluid passageways 272 and/or the plurality of second internal fluid passageways 274 (and fluid connections between various groupings of the plurality of first ports 214, the plurality of second ports 216, and/or the plurality of third ports 218).

Figure 20:
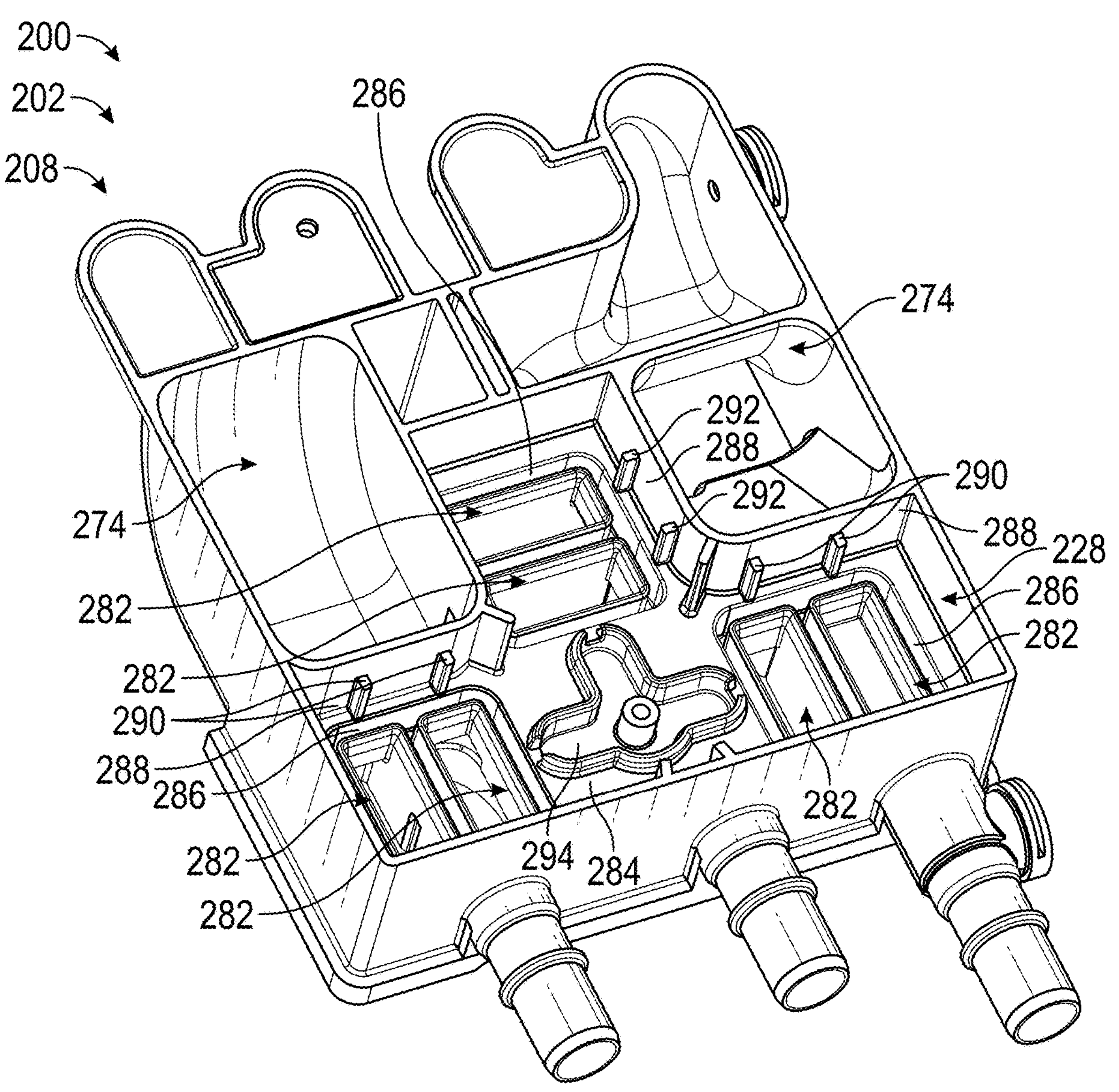
FIG. 20 is a top perspective view of a second housing of the thermal management control valve of FIG. 8.
Figure 21:
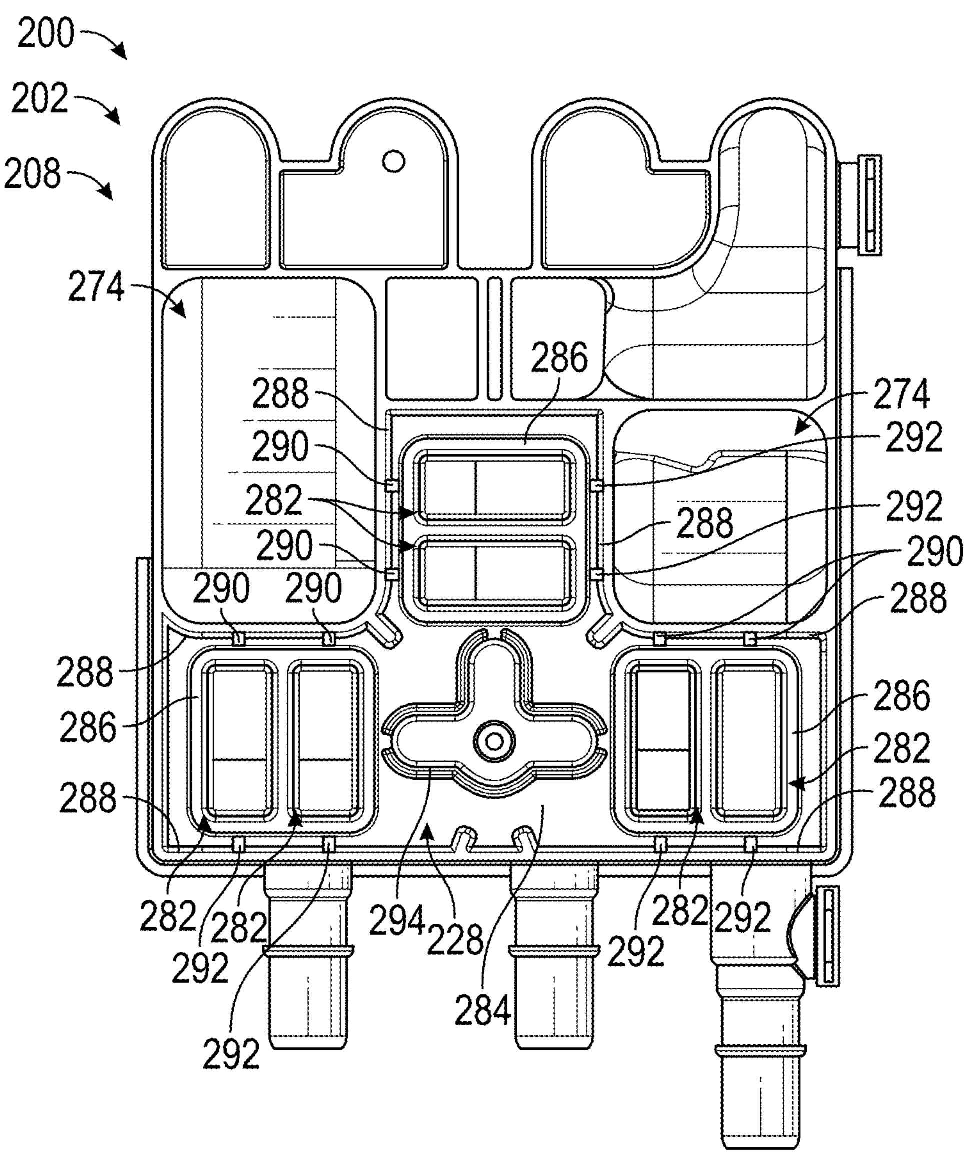
FIG. 21 is a top view of the second housing of FIG. 20.
Figure 22:
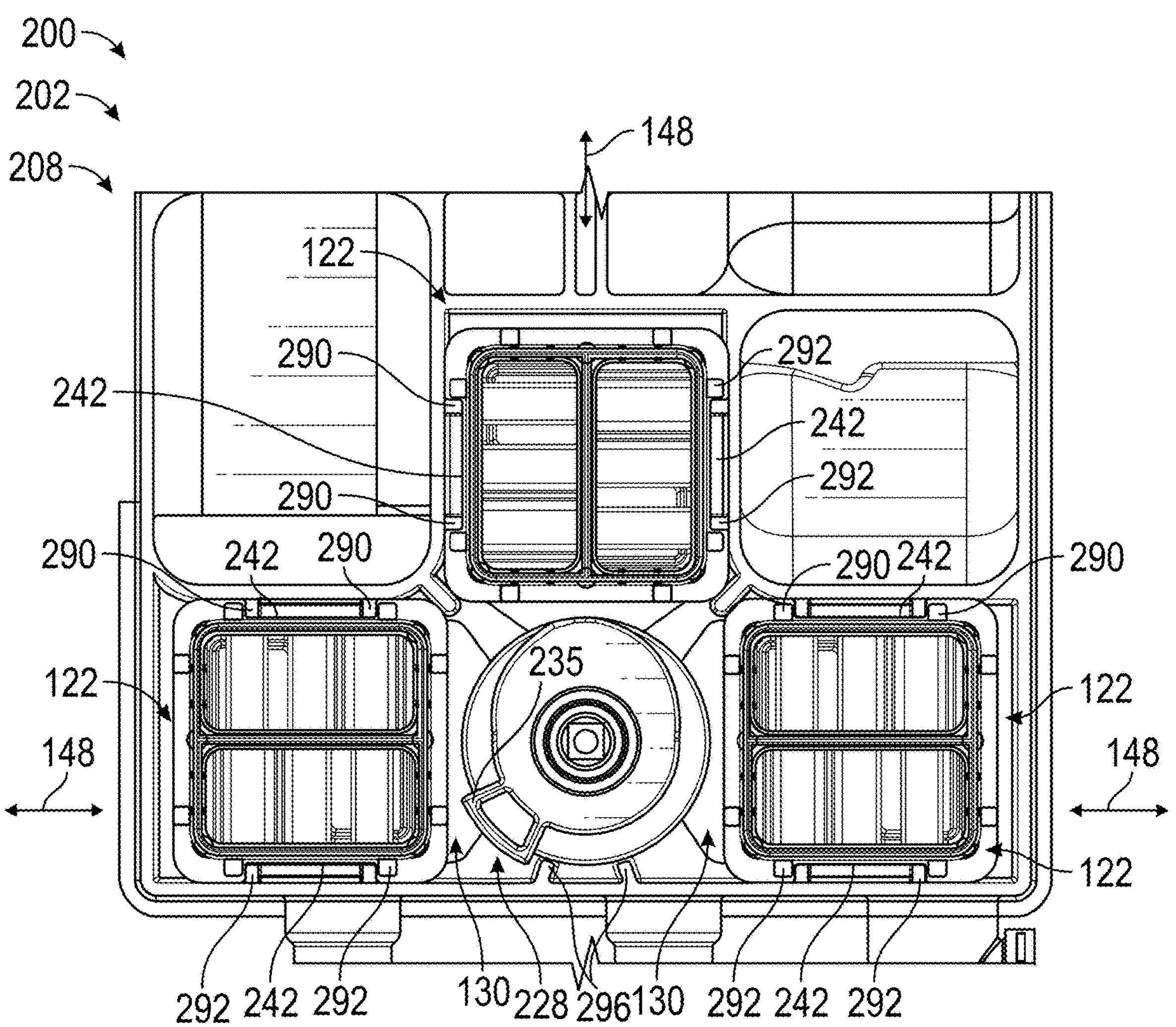
FIG. 22 is a top view of the thermal management control valve of FIG. 8 with a first housing removed.
Figure 23:
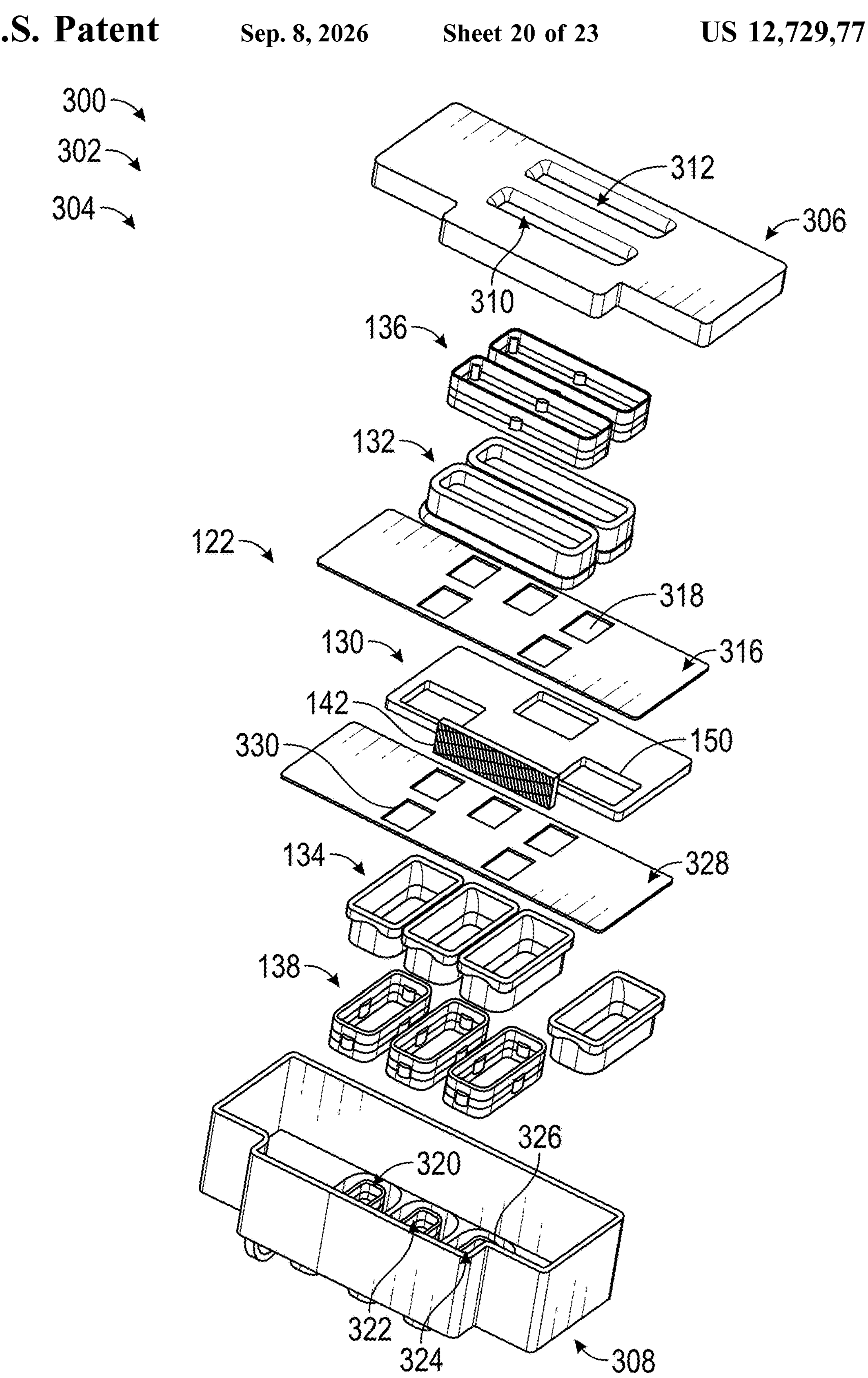
FIG. 23 is an exploded view of a thermal management control valve, according to an exemplary embodiment.
Figure 24:
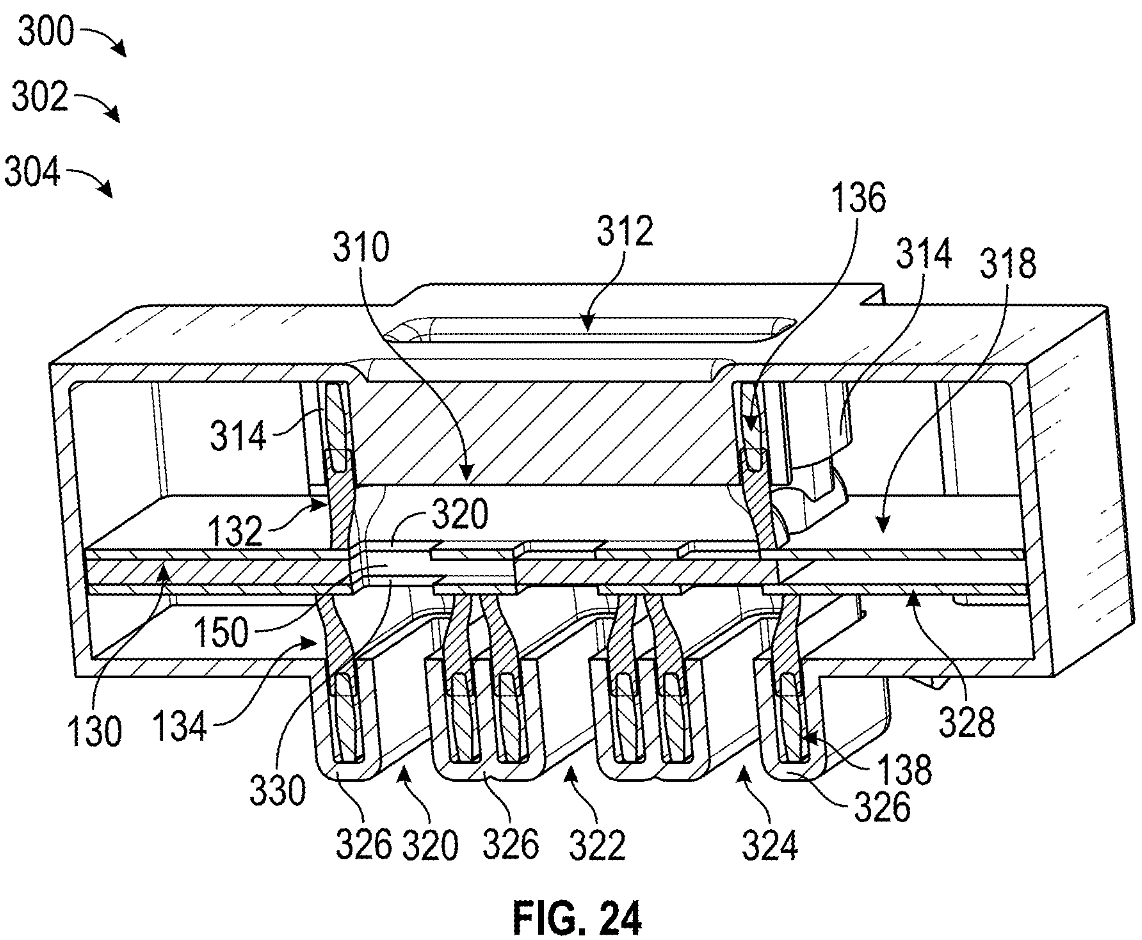
FIG. 24 is a cross-sectional view of the thermal management control valve of FIG. 23.

With specific reference to FIGS. 20-22, the second housing section 208 defines a recessed cavity that forms a portion of the louver manifold 228. The second internal wall 284 forms a portion of the louver manifold 228, and the second housing section 208 includes a plurality of sidewalls 288 that are arranged generally perpendicular to the second internal wall 284, and a frame recess 294 that is dimensioned to at least partially receive the guide frame 256 therein. Each of the louver plate assembly 122 interfaces with a plurality of mounting tabs that protrude outwardly from one or more of the plurality of sidewalls 288. In general, the mounting tabs aid in guiding the louver plates 130 along the louver direction 148, and help align the louver plates 130 with the corresponding first static seal plate 236 and second static seal plate 238 along the louver direction 148 during assembly. For example, each of the louver plate assembly 122 interfaces with a pair of first mounting tabs 290 and an opposing pair of second mounting tabs 292. The first mounting tabs 290 and the second mounting tabs 292 protrude outwardly from opposing sidewalls 288. The first mounting tabs 290 are spaced from one another along the louver direction 148, and the second mounting tabs 292 are spaced from one another along the louver direction 148. In the illustrated embodiments, one of the plurality of sidewalls 288 includes two stop tabs 296 that protrude outwardly from the sidewall 288. The stop tabs 296 are in the rotational path of the cam stop 235 of the cam wheel 234 and act as rotational stops for the cam wheel 234 (e.g., engagement between the cam stop 235 and either of the stop tabs 296 prevents further rotation of the cam wheel 234 in a particular direction).

When the louver plate assembly 122 is assembled in the louver manifold 228 of the second housing section 208, the first mounting tabs 290 and the second mounting tabs 292 act as a guide for the first static seal plate 236 and the second static seal plate 238. Specifically, the first static seal plate 236 and the second static seal plate 238 are installed so that the first mounting tabs 290 extend into the mounting notch 242 formed on one side of the first static seal plate 236, and into the mounting notch 246 formed on one side of the second static seal plate 238. Additionally, the second mounting tabs 292 extend into the mounting notch 242 formed on the opposing side of the first static seal plate 236 and into the mounting notch 246 formed on the opposing side of the second static seal plate 238. In the illustrated embodiment, the mounting notches 242 and the mounting notches 246 define a generally U-shaped profile. With the first mounting tabs 290 and the second mounting tabs 292 extending into the mounting notches 242 and the mounting notches 246, the first mounting tabs 290 and the second mounting tabs 292 constrain the location of the first static seal plate 236 and the second static seal plate 238 along the louver direction 148, which aids in aligning the first static seal plate 236 and the second static seal plate 238 along the louver direction 148.

In addition, the first mounting tabs 290 and the second mounting tabs 292 protrude outwardly from the opposing sidewalls 288 a predefined distance to define a gap between the first mounting tabs 290 and the second mounting tabs 292 in a direction perpendicular to the louver direction 148. The gap between the first mounting tabs 290 and the second mounting tabs 292 in the direction perpendicular to the louver direction 148 is dimensioned to fit the louver plate 130, the first seal plate 132, the second seal plate 134, the first static seal plate 236, and the second static seal plate 238 therebetween, which aids in locating these components during installation. The arrangement of the louver plate 130 between the first mounting tabs 290 and the second mounting tabs 292 also limits (e.g., prevents) movement of the louver plate 130 along a direction perpendicular to the louver direction 148 (e.g., rotation about the central axis 156), and helps guide the louver plate 130 along the louver direction 148 during operation of the louver plate assembly 122.

The design and properties of the housing assembly 202 and the louver plate assembly 122 enable the flow control assembly 204 to be assembled by stacking the components of the housing assembly 202 and the flow control assembly 204 (e.g., along a direction parallel to the central axis 156), which simplifies the assembly of the louver plate assemblies 122 and the thermal management control valve 200. For example, the guide frame 256 may be installed within the frame recess 294 and the second static seal 138 may be installed within at corresponding one of the second louver recess 286. The second seal plate 134 may then be installed upon the second static seal 138 in a rotational orientation that aligns with the second static seal 138 and so that the second seal plate 134 is within the gap formed between the first mounting tabs 290 and the second mounting tabs 292 to properly locate the second seal plate 134. The second static seal plate 238 may then be installed upon the second seal plate 134 so that the first mounting tabs 290 and the second mounting tabs 292 are arranged within the mounting notches 246 to constrain the location of the second static seal plate 238 along the louver direction 148 and properly locate the second static seal plate 238. The louver plate 130 may then be installed upon the second static seal plate 238 so that the louver plate 130 is arranged between the first mounting tabs 290 and the second mounting tabs 292, and the pin 248 (e.g., the second portion 254) extends into the guide frame 256. The louver plate 130 properly located within the guide frame 256 and within the gap formed between the first mounting tabs 290 and the second mounting tabs 292, the first static seal plate 236 may be installed upon the louver plate 130 so that the first mounting tabs 290 and the second mounting tabs 292 are arranged within the mounting notches 242 to constrain the location of the first static seal plate 236 along the louver direction 148 and properly locate the first static seal plate 236.

The first seal plate 132 may then be installed upon the first static seal plate 236 in a rotational orientation that aligns with the first static seal 136 and so that the first seal plate 132 is within the gap formed between the first mounting tabs 290 and the second mounting tabs 292 to properly locate the first seal plate 132. The first static seal 136 may be installed within a corresponding one of the first louver recess 280 of the first housing section 206. When the first housing section 206 is installed on the second housing section 208, the first static seal 136 may engage the first seal plate 132. Prior to installing the first housing section 206 on the second housing section 208, the drive shaft 224 and the cam wheel 234 may be installed within the louver manifold 228 so that the pins 248 (e.g., the first portion 252) are received within the cam slot 250.

As described herein, the louver plate assembly 122 may be designed to accommodate various porting and flow path configurations. FIGS. 23, 24, and 25A-25F show an exemplary embodiment of a thermal management control valve 300 with a housing assembly 302 and a flow control assembly 304 that includes the louver plate assembly 122. In general, the design and functionality of the thermal management control valve 300 may be similar to the thermal management control valve 100, with similar features identified using like reference numerals, except as described herein or as apparent in the figures. The housing assembly 302 includes a first or upper housing section 306 and a second or lower housing section 308. The first housing section 306 includes a first housing port 310 and a second housing port 312 that both extend through the first housing section 306. Each of the first housing port 310 and the second housing port 312 are bordered by a first louver recess 314 that at least partially receives one of the first static seal 136. In the illustrated embodiment, the louver plate assembly 122 includes individual first static seals 136 for each of the first housing port 310 and the second housing port 312, and similarly includes individual first seal plates 132 sealed between the first static seals 136 and a first static seal plate 316. In the illustrated embodiment, the first static seal plate 316 includes a plurality of apertures, holes, cutouts, shown as a plurality of first static seal plate slots 318. Each of the plurality of first static seal plate slots 318 extends through the first static seal plate 316 to define a flow path therethrough. In the illustrated embodiment, the plurality of first static seal plate slots 318 are arranged in an array that includes five of the first static seal plate slots 318. In some embodiments, the first static seal plate 316 may include more or less than five of the first static seal plate slots 318.

The second housing section 308 includes a third housing port 320, a fourth housing port 322, and a fifth housing port 324 that each extend through the second housing section 308. Each of the third housing port 320, the fourth housing port 322, and the fifth housing port 324 are bordered by a second louver recess 326 that at least partially receives one of the second static seals 138. In the illustrated embodiment, the louver plate assembly 122 includes individual second static seals 138 for each of the third housing port 320, the fourth housing port 322, and the fifth housing port 324, and similarly includes individual second seal plates 134 sealed between the second static seals 138 and a second static seal plate 328. In the illustrated embodiment, the second static seal plate 328 includes a plurality of apertures, holes, cutouts, shown as a plurality of second static seal plate slots 330. Each of the plurality of plurality of second static seal plate slots 330 extends through the second static seal plate 328 to define a flow path therethrough. In the illustrated embodiment, the plurality of plurality of second static seal plate slots 330 are arranged in an array that includes five of the plurality of second static seal plate slots 330. In some embodiments, the second static seal plate 328 may include more or less than five of the plurality of second static seal plate slots 330.

The first static seal plate 316 and the plurality of first static seal plate slots 318 are sealed against opposing sides of the louver plate 130. In this arrangement, the first static seal plate 316 seals against the upper or first louver surface 152 of the louver plate 130, and the first seal plates 132 are sealed between the first static seal plate 316 and the first static seals 136. Similarly, the second static seal plate 328 is sealed against the lower or second louver surface 154 of the louver plate 130, and the second seal plates 134 are sealed between the second static seal plate 328 and the second static seals 138.

The first seal plates 132 defines a different rotational orientation about the central axis 156 than the second seal plates 134 so that the louver plate assembly 122 forms a plurality of louver ports or passageways that are selectively opened and closed, via movement of the louver plate 130 along the louver direction 148, to provide and inhibit fluid flow along various flow paths formed between the first housing port 310, the second housing port 312, the third housing port 320, the 322, and the fifth housing port 324. In the illustrated embodiment, the first seal plates 132 are each arranged in a rotational orientation that is about ninety degrees offset relative to a rotational orientation of the second seal plates 134 about the central axis 156 In this orientation, the first seal plate slots 162 are elongated in a direction that is generally parallel to the louver direction 148, and the second seal plate slots 174 are elongated in a direction that is generally perpendicular to the louver direction 148. With the louver plate assembly 122 including two of the first seal plates 132, each including one of the first seal plate slots 162, and three of the second seal plates 134, each including one of the second seal plate slots 174, the different rotational orientation between the first seal plates 132 and the second seal plates 134 about the central axis 156 defines five louver ports or passageways within the louver plate assembly 122. Specifically, the louver plate assembly 122 defines a first louver passageway 332, a second louver passageway 334, a third louver passageway 336, a fourth louver passageway 338, and a fifth louver passageway 340.

In general, each of the first louver passageway 332, the second louver passageway 334, the third louver passageway 336, the fourth louver passageway 338, and the fifth louver passageway 340 is opened when one of the louver slots 150 aligns or overlaps with one of the plurality of first static seal plate slots 318 and a corresponding one of the plurality of second static seal plate slots 330. Each of the first louver passageway 332, the second louver passageway 334, the third louver passageway 336, the fourth louver passageway 338, and the fifth louver passageway 340 is closed when one of the louver plate 130 blocks (e.g., the louver slots 150 are all misaligned with) with one of the plurality of first static seal plate slots 318 and a corresponding one of the plurality of second static seal plate slots 330 that align with the connection provided by the respective fluid passageway.

Figure 25A:
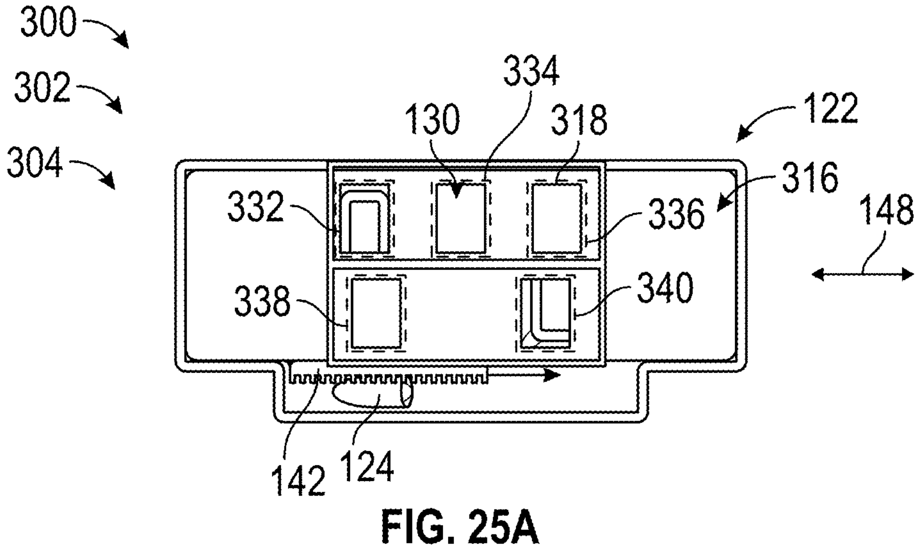
FIG. 25A is a top view of the thermal management control valve of FIG. 23 with a louver plate in a first position.
Figure 25B:
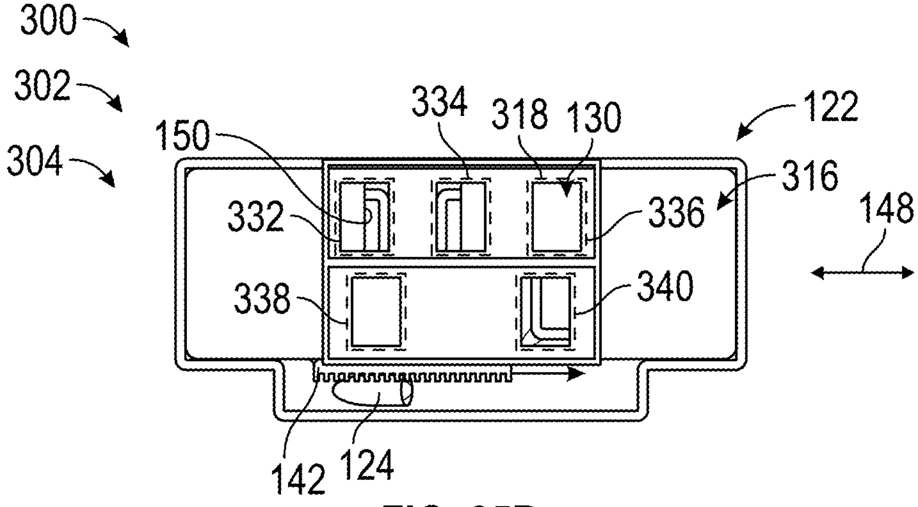
FIG. 25B is a top view of the thermal management control valve of FIG. 23 with a louver plate in a first intermediate position.
Figure 25C:
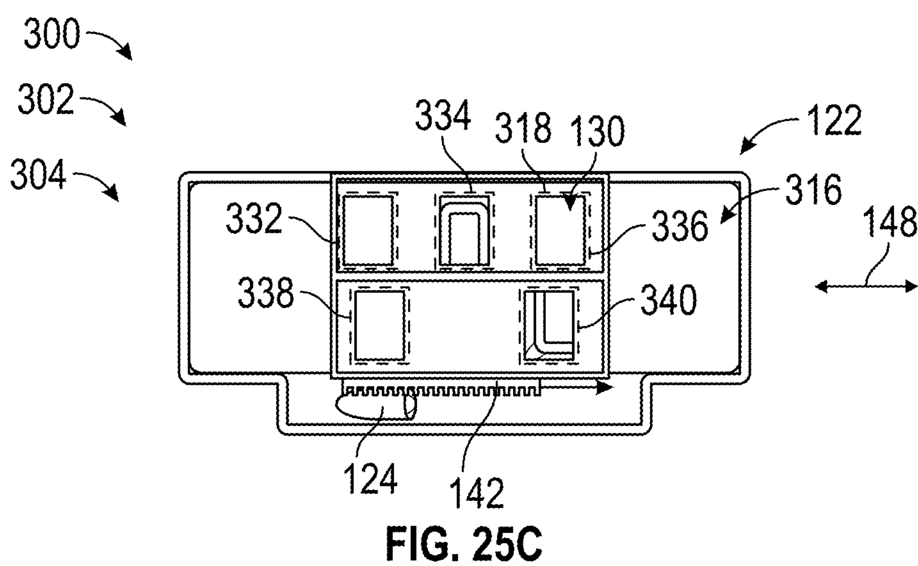
FIG. 25C is a top view of the thermal management control valve of FIG. 23 with a louver plate in a second position.
Figure 25D:
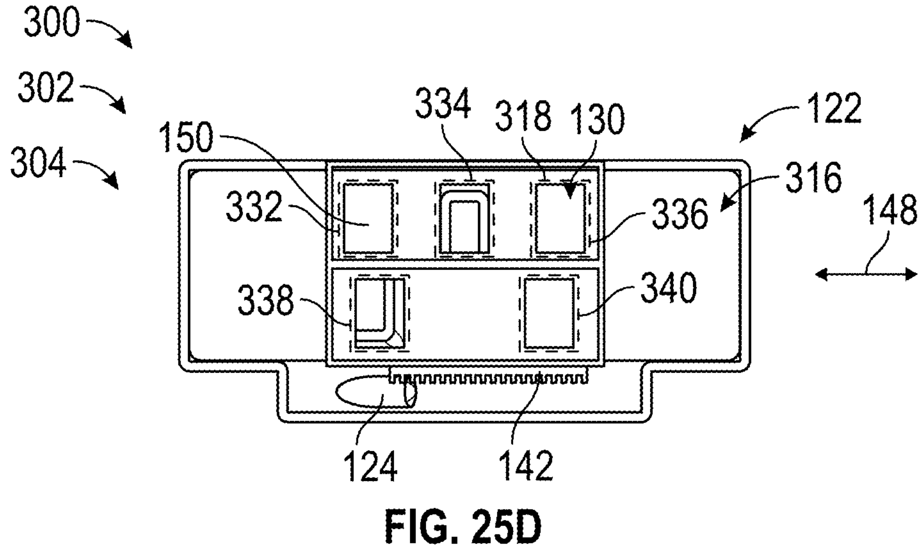
FIG. 25D is a top view of the thermal management control valve of FIG. 23 with a louver plate in a third position.
Figure 25E:
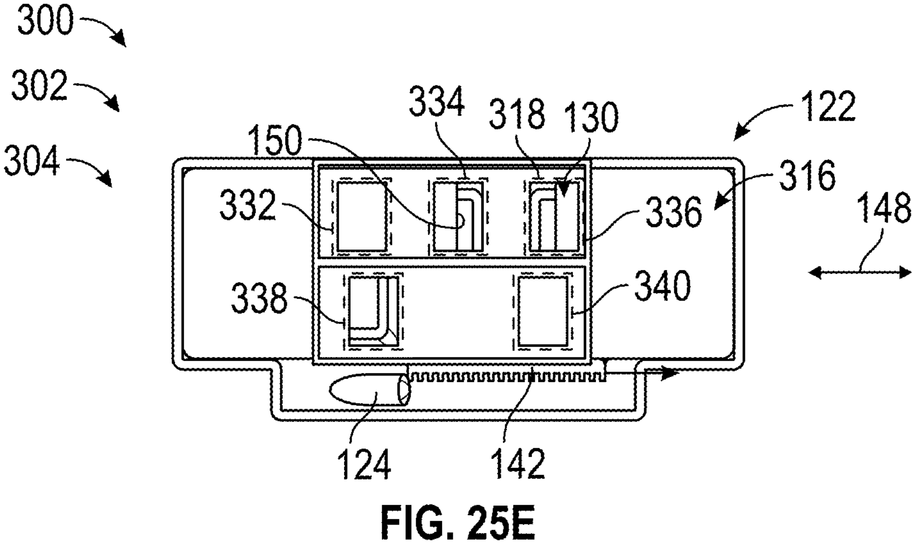
FIG. 25E is a top view of the thermal management control valve of FIG. 23 with a louver plate in a second intermediate position.
Figure 25F:
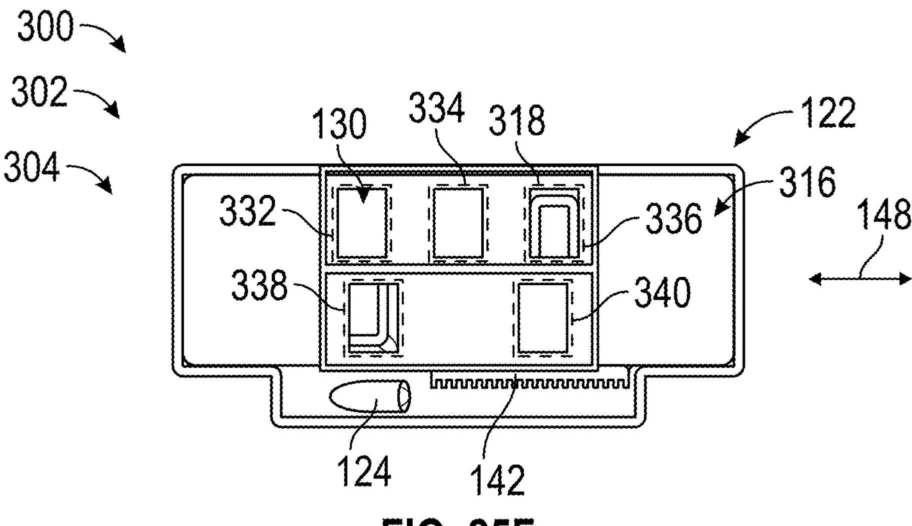
FIG. 25F is a top view of the thermal management control valve of FIG. 23 with a louver plate in a fourth position.

With specific reference to FIGS. 25A-25F, in an exemplary embodiment, the louver plate 130 may be selectively movable along the louver direction 148, by the drive shaft 124 and the rotary actuator 120, between a first position (FIG. 25A), a second position (FIG. 25C), a third position (FIG. 25D), and a fourth position (FIG. 25F). As shown in FIG. 25A, with the louver plate 130 in the first position, one of the louver slots 150 aligns with one of the plurality of first static seal plate slots 318 and a corresponding one of the plurality of second static seal plate slots 330 and, thereby, opens the first louver passageway 332 and a first flow path is provided through the louver plate 130. The first flow path provided along the first louver passageway 332 provides fluid communication between the second housing port 312 and the third housing port 320. Additionally, with the louver plate 130 in the first position, another one of the louver slots 150 aligns with another one of the plurality of first static seal plate slots 318 and a corresponding one of the plurality of second static seal plate slots 330 and, thereby, opens the fifth louver passageway 340 and a second flow path is provided through the louver plate 130. The second flow path provided along the fifth louver passageway 340 provides fluid communication between the first housing port 310 and the fifth housing port 324. The second louver passageway 334, the third louver passageway 336, and the fourth louver passageway 338 are each blocked by the louver plate 130 when the louver plate 130 is in the first position, and fluid flow therethrough is inhibited.

As shown in FIG. 25C, with the louver plate 130 in the second position, one of the louver slots 150 aligns with one of the plurality of first static seal plate slots 318 and a corresponding one of the plurality of second static seal plate slots 330 and, thereby, opens the second louver passageway 334 and a third flow path is provided through the louver plate 130. The third flow path provided along the second louver passageway 334 provides fluid communication between the second housing port 312 and the fourth housing port 322. Additionally, with the louver plate 130 in the second position, another one of the louver slots 150 aligns with another one of the plurality of first static seal plate slots 318 and a corresponding one of the plurality of second static seal plate slots 330 and, thereby, opens the fifth louver passageway 340 and fluid flow is again provided along the second flow path is provided through the louver plate 130. The first louver passageway 332, the third louver passageway 336, and the fourth louver passageway 338 are each blocked by the louver plate 130 when the louver plate 130 is in the first position, and fluid flow therethrough is inhibited.

As shown in FIG. 25D, with the louver plate 130 in the third position, one of the louver slots 150 aligns with one of the plurality of first static seal plate slots 318 and a corresponding one of the plurality of second static seal plate slots 330 and, thereby, opens the second louver passageway 334 and fluid flow is provided along the third flow path. Additionally, with the louver plate 130 in the second position, another one of the louver slots 150 aligns with another one of the plurality of first static seal plate slots 318 and a corresponding one of the plurality of second static seal plate slots 330 and, thereby, opens the fourth louver passageway 338 and fluid flow is provided along a fourth flow path through the louver plate 130. The fourth flow path provided along the fourth louver passageway 338 provides fluid communication between the first housing port 310 and the third housing port 320. The first louver passageway 332, the third louver passageway 336, and the fifth louver passageway 340 are each blocked by the louver plate 130 when the louver plate 130 is in the first position, and fluid flow therethrough is inhibited.

As shown in FIG. 25F, with the louver plate 130 in the fourth position, one of the louver slots 150 aligns with one of the plurality of first static seal plate slots 318 and a corresponding one of the plurality of second static seal plate slots 330 and, thereby, opens the third louver passageway 336 and fluid flow is provided along the fifth flow path. The fifth flow path provided along the third louver passageway 336 provides fluid communication between the second housing port 312 and the fifth housing port 324. Additionally, with the louver plate 130 in the second position, another one of the louver slots 150 aligns with another one of the plurality of first static seal plate slots 318 and a corresponding one of the plurality of second static seal plate slots 330 and, thereby, opens the fourth louver passageway 338 and fluid flow is provided along the fourth flow path. The first louver passageway 332, the second louver passageway 334, and the fifth louver passageway 340 are each blocked by the louver plate 130 when the louver plate 130 is in the first position, and fluid flow therethrough is inhibited.

As described herein, the louver plate assembly 122 selectively provides or inhibits fluid flow along five different fluid passageways or flow paths, and the louver plate 130 is selectively movable between four different positions along the louver direction 148. Accordingly, in the exemplary embodiment, the louver plate assembly 122 provides the functionality of a 5-way, 4-position valve without requiring multiple louver plate assemblies 122 be integrated into the housing assembly 302. In this way, for example, the louver plate assembly 122 enables the thermal management control valve 300 to service additional fluid flow needs/components with a smaller packaging size.

In an exemplary embodiment, the louver plate assembly 122 may be movable to intermediate positions between the first position, the second position, the third position, the fourth position, and/or the fifth position. In general, the intermediate positions enable the louver plate assembly 122 to proportion flow to various ports of the housing assembly 302 (e.g., one flow path closes off, while a different flow path opens up). For example, FIG. 25B shows the louver plate 130 in a first intermediate position between the first position and the second position. In the first intermediate position, the first louver passageway 332 (e.g., the first flow path) and the second louver passageway 334 (e.g., the third flow path) are both partially opened (e.g., the first louver passageway 332 is closing off and the second louver passageway 334 is opening up), and the fifth louver passageway 340 (e.g., the second flow path) is opened.

FIG. 25E shows the louver plate 130 in a second intermediate position between the third position and the fourth position. In the second intermediate position, the second louver passageway 334 (e.g., the third flow path) and the third louver passageway 336 (e.g., the fifth flow path) are both partially opened (e.g., the second louver passageway 334 is closing off and the third louver passageway 336 is opening up), and the fourth louver passageway 338 (e.g., the fourth flow path) is opened.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the thermal management control valve 100, 200, 300 as shown in the various exemplary embodiments is illustrative only. Additionally, any element disclosed in one embodiment may be incorporated or utilized with any other embodiment disclosed herein.

What is claimed is:

1. A thermal management control valve comprising:

a housing assembly including a first housing section and a second housing section;

a rotary actuator coupled to a drive shaft that extends into the housing assembly; and a louver plate assembly enclosed within the housing assembly and including:

a louver plate including a plurality of louver slots, each extending through the louver plate, wherein the louver plate is coupled to the drive shaft so that rotation of the drive shaft is configured to selectively move the louver plate along a louver direction between a first position and a second position;

a first seal plate arranged between the louver plate and the first housing section, wherein the first seal plate includes one or more first seal plate slots that are elongated in a direction that is generally parallel to the louver direction; and a second seal plate arranged between the louver plate and the second housing section, wherein the second seal plate includes one or more second seal plate slots that are elongated in a direction that is generally perpendicular to the louver direction.

2. The thermal management control valve of claim 1, wherein when the louver plate is in the first position, a first group of the plurality of louver slots opens a first flow path and a second flow path through the louver plate.

3. The thermal management control valve of claim 2, wherein when the louver plate is in the first position, a third flow path and a fourth flow path are blocked by the louver plate.

4. The thermal management control valve of claim 3, wherein when the louver plate is in the second position, a second group of the plurality of louver slots opens the third flow path and the fourth flow path through the louver plate.

5. The thermal management control valve of claim 4, wherein when the louver plate is in the second position, the first flow path and the second flow path are blocked by the louver plate.

6. The thermal management control valve of claim 1, wherein the housing assembly includes a first housing port, a second housing port, a third housing port, and a fourth housing port.

7. The thermal management control valve of claim 6, wherein when the louver plate is in the first position, a first group of the plurality of louver slots provide fluid communication between the first housing port and the fourth housing port, and between the second housing port and the third housing port.

8. The thermal management control valve of claim 7, wherein when the louver plate is in the second position, a second group of the plurality of louver slots provide fluid communication between the first housing port and the third housing port, and between the second housing port and the fourth housing port.

9. The thermal management control valve of claim 1, wherein the louver plate assembly further includes a first static seal plate arranged between the first seal plate and the louver plate, and a second static seal plate arranged between the second seal plate and the louver plate.

10. The thermal management control valve of claim 9, wherein the first static seal plate includes a plurality of first static seal plate slots and the second static seal plate includes a plurality of second static seal plate slots, and wherein each of the plurality of first static seal plate slots aligns with a corresponding one of the plurality of second static seal plate slots.

11. The thermal management control valve of claim 10, wherein the louver plate moves between the first position and the second position to selectively align at least one of the plurality of louver slots with an aligned set of the plurality of first static seal plate slots and the plurality of second static seal plate slots to provide fluid flow through the louver plate.

12. The thermal management control valve of claim 1, wherein a rotational orientation defined by the first seal plate about a central axis is different than a rotational orientation of the second seal plate, so that the louver plate assembly defines a first louver passageway, a second louver passageway, a third louver passageway, and a fourth louver passageway that are each selectively opened and closed by the louver plate moving, via the rotary actuator between the first position and the second position.

13. The thermal management control valve of claim 1, wherein the second housing section at least partially defines a louver manifold that receives the louver plate assembly, and wherein the louver manifold is defined by a plurality of sidewalls that extends upwardly from an internal wall of the second housing section.

14. The thermal management control valve of claim 13, wherein the second housing section includes a first pair of mounting tabs and a second pair of mounting tabs that protrude outwardly from an opposing pair of the plurality of sidewalls.

15. The thermal management control valve of claim 14, wherein the first pair of mounting tabs and the second pair of mounting tabs guide the louver plate along the louver direction and limit movement of the louver plate in a direction perpendicular to the louver direction.

16. A thermal management control valve comprising:

a housing assembly including a first housing section and a second housing section;

a rotary actuator coupled to a drive shaft that extends into the housing assembly; and a louver plate assembly enclosed within the housing assembly and including:

a louver plate including a plurality of louver slots, each extending through the louver plate, wherein the louver plate is coupled to the drive shaft so that rotation of the drive shaft is configured to selectively move the louver plate along a louver direction between a first position and a second position;

a first seal plate arranged between the louver plate and the first housing section, and including one or more first seal plate slots; and a second seal plate arranged between the louver plate and the second housing section, and including one or more second seal plate slots, wherein the first seal plate and the second seal plate are arranged along a central axis, wherein the first seal plate defines a different rotational orientation about the central axis than the second seal plate, and wherein the different rotational orientation defines a first louver passageway, a second louver passageway, a third louver passageway, and a fourth louver passageway within the louver plate assembly that are selectively opened and closed by movement of the louver plate between the first position and the second position.

17. The thermal management control valve of claim 16, wherein the first seal plate is arranged in a rotational orientation that is about ninety degrees offset relative to a rotational orientation of the second seal plate about the central axis.

18. The thermal management control valve of claim 16, wherein the louver plate assembly further includes a first static seal plate arranged between the first seal plate and the louver plate, and a second static seal plate arranged between the second seal plate and the louver plate, wherein the first static seal plate includes a plurality of first static seal plate slots and the second static seal plate includes a plurality of second static seal plate slots, and wherein each of the plurality of first static seal plate slots aligns with a corresponding one of the plurality of second static seal plate slots.

19. A thermal management control valve comprising:

a housing assembly including a first housing section and a second housing section, wherein the second housing section at least partially defines a louver manifold, and wherein the louver manifold includes a pair of opposing sidewalls;

a first pair of mounting tabs that protrude outwardly from one of the pair of opposing sidewalls;

a second pair of mounting tabs that protrude outwardly from another of the pair of opposing sidewalls; and a louver plate assembly at least partially received within the louver manifold and including:

a louver plate having a pair of opposing outside walls contacting the first and second pair of mounting tabs, respectively;

a first seal plate; and a first static seal plate arranged between the first seal plate and the second housing section, and including mounting notches arranged on opposing outer surfaces thereof, wherein the first seal plate is arranged between the louver plate and the first static seal plate, wherein the first pair of mounting tabs extend into the mounting notch formed on one of the opposing outer surfaces and the second pair of mounting tabs extend into the mounting notch on another of the opposing outer surfaces, so that the first pair of mounting tabs and the second pair of mounting tabs constrain a location of the first static seal plate within the louver manifold.

20. The thermal management control valve of claim 19, wherein the louver plate is coupled to a drive shaft that is driven by a rotary actuator so that rotation of the drive shaft is configured to selectively move the louver plate along a louver direction between a first position and a second position, and wherein the first pair of mounting tabs and the second pair of mounting tabs guide the louver plate along the louver direction and limit movement of the louver plate in a direction perpendicular to the louver direction.

* * * * *